US012793332B2

(12) United States Patent

Barnett et al.

(10) Patent No.: US 12,793,332 B2

(45) Date of Patent: Nov. 10, 2026

(54) TACTILE COPRESENCE

(71) Applicant: Google LLC, Mountain View, CA (US)

(72) Inventors: Donald Allen Barnett, Monroe, WA (US); Carsten Hinz, Überlingen (DE); Corbin Alexander Cunningham, Seattle, WA (US); George Joseph Rickerby, London (GB); Benjamin Guy Alexander Pawle, London (GB); Michael Colville, London (GB); Scott Douwes, Mountain View, CA (US)

(73) Assignee: Google LLC, Mountain View, CA (US)

( * ) Notice: Subject to any disclaimer, the term of this patent is extended or adjusted under 35 U.S.C. 154(b) by 107 days.

(21) Appl. No.: 18/574,878

(22) PCT Filed: Jul. 29, 2021

(86) PCT No.: PCT/US2021/043694

§ 371 (c)(1),
(2) Date: Dec. 28, 2023

(87) PCT Pub. No.: WO2023/009124

PCT Pub. Date: Feb. 2, 2023

(65) Prior Publication Data

US 2024/0320904 A1 Sep. 26, 2024

(51) Int. Cl.
*G06T 15/60* (2006.01)
*G06F 3/0346* (2013.01)
(Continued)

(52) U.S. Cl.
CPC ............ *G06T 15/60* (2013.01); *G06F 3/0346* (2013.01); *G06T 3/40* (2013.01); *G06T 5/70* (2024.01);
(Continued)

(58) Field of Classification Search
CPC .. G06T 15/60; G06T 3/40; G06T 5/70; G06T 7/50; G06F 3/0346; G09G 3/001;
(Continued)

(56) References Cited

U.S. PATENT DOCUMENTS

| | | | | |
|---|---|---|---|---|
| 11,245,871 | B1 * | 2/2022 | Gandhi .................... | H04N 7/15 |
| 2010/0188478 | A1 | 7/2010 | Robinson et al. | |

(Continued)

OTHER PUBLICATIONS

International Search Report and Written Opinion for Application No. PCT/US21/43694 dated Apr. 21, 2022 (24 pages).

(Continued)

*Primary Examiner* — Stella L. Woo

(74) *Attorney, Agent, or Firm* — Botos Churchill IP Law LLP

(57) ABSTRACT

The technology provides tactile copresence for participants working in a real-time remote collaborative arrangement. This enhanced user experience enables different users to work remotely through their own local physical media such as whiteboards, large screen displays or poster boards (208, 228, 262, 272). Participants are able to view a common workspace in the same way, and are able to experience tactile copresence via silhouette representations (106, 312, 600) of the other people. A method includes receiving depth map information of a participant at a first location, the depth map information being derived from a raw image captured at the first location (904). A presence shadow for the participant is generated by a computing device associated with a different location, in which the presence shadow reprojects aspects of the participant according to the depth map information where the aspects are blurred according to a proximity of each aspect to a physical medium at the first location (906).

25 Claims, 30 Drawing Sheets

(51) Int. Cl.

| | |
|---|---|
| ***G06T 3/40*** | (2024.01) |
| ***G06T 5/70*** | (2024.01) |
| ***G06T 7/50*** | (2017.01) |
| ***G09G 3/00*** | (2006.01) |
| ***H04N 7/15*** | (2006.01) |

(52) U.S. Cl.
CPC ............... *G06T 7/50* (2017.01); *G09G 3/001* (2013.01); *H04N 7/15* (2013.01); *G09G 2354/00* (2013.01)

(58) Field of Classification Search
CPC ...... G09G 2354/00; H04N 7/15; H04N 7/147; G06Q 10/03; G06Q 65/4015; G06Q 65/403; G06Q 67/54; G06Q 7/152
See application file for complete search history.

(56) References Cited

U.S. PATENT DOCUMENTS

| | | | | |
|---|---|---|---|---|
| 2013/0050398 | A1* | 2/2013 | Krans | H04N 7/147 348/E7.083 |
| 2014/0232816 | A1 | 8/2014 | Wilson et al. | |
| 2014/0362163 | A1* | 12/2014 | Winterstein | H04N 7/15 348/14.07 |
| 2015/0244976 | A1* | 8/2015 | Chen | H04N 7/142 348/14.07 |
| 2015/0271446 | A1 | 9/2015 | Browne et al. | |
| 2016/0098969 | A1 | 4/2016 | Lee et al. | |
| 2017/0344168 | A1* | 11/2017 | Tone | G06F 16/13 |
| 2018/0107281 | A1 | 4/2018 | Kramer et al. | |
| 2019/0312917 | A1* | 10/2019 | Choi | G06Q 10/103 |
| 2019/0341050 | A1* | 11/2019 | Diamant | G06V 40/172 |
| 2020/0162274 | A1 | 5/2020 | Iyer et al. | |
| 2021/0286502 | A1* | 9/2021 | Lemay | G06T 19/006 |
| 2022/0335620 | A1* | 10/2022 | Ostap | G06T 5/94 |

OTHER PUBLICATIONS

Apperley, Mark , et al., "Use of video shadow for small group interaction awareness on a large interactive display surface", Advances in Ontologies, Australian Computer Society, Inc, P.O. Box 319 Darlinghurst, NSW 2010 Australia, Feb. 1, 2003, pp. 81-90.
Pizarro, Rodrigo , et al., "Augmenting Remote Presence for Interactive Dashboard Collaborations", Interactive Tabletops & Surfaces, ACM, 2 Penn Plaza, Suite 701 New York NY 10121-0701 USA, Nov. 15, 2015, pp. 235-240.

* cited by examiner

100

110

260

270

280

300

310

322

312

320

330

340

350

360

370

400

500

510

520

530 540 550

560 570 580

700

720

760

740

820

800

900

TACTILE COPRESENCE

CROSS-REFERENCE TO RELATED APPLICATIONS

The present application is a national phase entry under 35 U.S.C. § 371 of International Application No. PCT/US21/43694, filed Jul. 29, 2021, published in English, the entire disclosure of which is incorporated herein by reference.

BACKGROUND

Real-time interactive communication can take on many forms. Videoconferencing or other applications that employ high fidelity user imagery can help provide contextual information about the participants, which can promote robust and informative communication. However, even with smart whiteboards and similar media it can be challenging to have remote collaboration where different participants are working on the same thing at the same time. In addition, being on-screen via full motion video can be difficult for participants, especially during long sessions or back-to-back meetings, since it is not so simple to disengage from being an active participant while continuing in the session. Connectivity issues and other bandwidth concerns, background distractions, and information overload from multiple video feeds can also create issues and hinder collaboration.

BRIEF SUMMARY

The technology relates to methods and systems that provide tactile copresence for participants working in a real-time remote collaborative arrangement. This enhanced user experience enables different users to work remotely through their own local physical media such as whiteboards, large screen displays or even poster boards. While participants may be in different physical locations, they are all able to view a common workspace in the same way (e.g., a 1:1 scale so that all participants see the same information presented equivalently and none is cut off or otherwise lost). The participants are also able to experience tactile copresence via silhouette representations ("presence shadows") of other people, which may be generated by respective imaging devices that provided three-dimensional pose tracking at the different locations.

Such body profile-based silhouette representations, which require much less bandwidth than full motion video and can minimize connectivity issues (e.g., dropped packets, bandwidth constraints, etc.), can show gestures and positioning as well as the relative proximity of a given participant to the common workspace. This provides rich contextual information about the participants, while at the same time allowing someone to both physically and metaphorically "step away" from the workspace in order to think about something being discussed without totally disengaging from the other participants. Spatial acoustics can be used to complement the silhouette representations and enrich the copresence experience. The technology can be employed in a wide variety of interactive applications. This can include videoconferencing, personal tutorials (e.g., for calligraphy or music), games (e.g., charades, tic-tac-toe, hangman), etc. With a minimal amount of hardware and software infrastructure, a tactile copresence setup can be a simple, cost-effective solution for almost any sized workspace that a user may have. This can enable wide deployment with minimal technical restrictions.

According to one aspect of the technology, a method comprises accessing, via a first computing device associated with a first participant at a first physical location, a copresence program configured to support multiple participants, the first physical location including a first physical medium configured to display information of the copresence program; receiving, by one or more processors associated with the first physical location, depth map information of a second participant at a second physical location, the depth map information being derived from a raw image associated with the second participant captured at the second physical location; generating, by the one or more processors associated with the first physical location, a presence shadow corresponding to the second participant, the presence shadow reprojecting aspects of the second participant according to the depth map information where the aspects are blurred according to a proximity of each aspect to a second physical medium at the second physical location; and displaying using the copresence program, on the first physical medium, the presence shadow corresponding to the second participant.

One or more of the aspects closest to the second physical medium may be generated to have a first amount of blurring while one or more of the aspects farthest from the second physical medium are generated to have a second amount of blurring greater than the first amount. The presence shadow may be configured to illustrate at least one of gesturing or positioning of the second participant. Generating the presence shadow may include inverting the depth map information prior to blurring. The presence shadow may only displayed when the second participant is within a threshold distance of the second physical medium.

The method may further comprise receiving collaborative information added to the second physical medium; and displaying the received collaborative information on the first physical medium along with the presence shadow corresponding to the second participant. Here, the method may further comprise receiving additional collaborative information added to the first physical medium; and integrating the additional collaborative information with the received collaborative information to form a set of integrated collaborative information. This may further include generating one or more bookmarks of the set of integrated collaborative information. The received collaborative information may be displayed at a first resolution while the presence shadow is displayed at a second resolution lower than the first resolution.

The depth map information of the second participant may further includes three-dimensional positioning information of a writing implement, and displaying the received collaborative information may include generating a scaled representation of the received collaborative information based on the three-dimensional positioning information of the writing implement. The raw image of the second participant may be taken from a viewpoint where the second participant is between the second physical medium and a second image capture device at the second physical location.

The method may further comprise capturing, at the first physical location, a raw image of the first participant; and transmitting depth map information derived from the raw image of the first participant to a computing device associated with the second physical location. Here, a presence shadow of the first participant may not be displayed on the first physical medium at the first physical location.

The method may further comprise receiving audio information of the second participant; and playing the received audio information at the first physical location in conjunction with displaying the presence shadow of the second participant. The method may further comprise using the depth map information to separate images of the second participant at the second physical location from collaborative information added to the second physical medium. The presence shadow may be generated based on a set of skeleton coordinates derived from an image of the second participant.

The method may further include saving an interactive collaboration of the copresence program in memory. Saving the interactive collaboration may include saving one or more snapshots of collaborative information added to either the first physical medium or the second physical medium.

The method may further comprise identifying tactile input onto either the first physical medium or the second physical medium; associating the identified tactile input with an action; and either (i) changing how selected information is displayed on the first physical medium based on the action, or (ii) performing a computing operation in response to the action. Changing how the selected information is displayed may include at least one of moving, scaling, translating or rotating a piece of collaborative information. The computing operation may be at least one of copying, pasting, saving or transmitting.

According to another aspect of the technology, a system associated with a first participant at a first physical location is provided. The system comprises a projector configured to display information on a first physical medium located at the first physical location and a first computing device having one or more processors. The first computing device is operatively coupled to the projector, and the one or more processors are configured to: access a copresence program configured to support multiple participants; receive depth map information of a second participant at a second physical location, the depth map information being derived from a raw image associated with the second participant captured at the second physical location; generate a presence shadow corresponding to the second participant, the presence shadow reprojecting aspects of the second participant according to the depth map information where the aspects are blurred according to a proximity of each aspect to a second physical medium at the second physical location; and cause the projector to display on the first physical medium, using the copresence program, the presence shadow corresponding to the second participant.

The one or more processors may be further configured to: receive collaborative information added to the second physical medium; and cause the projector to display the received collaborative information on the first physical medium along with the presence shadow corresponding to the second participant. The system may further include an image capture device configured to capture imagery associated with the first participant at the first physical location, in which the image capture device has a field of view encompassing the first physical medium. Here, the image capture device may be configured to capture a raw image of the first participant; the one or more processors may be configured to generate depth map information of the first participant based on the captured raw image; and the one or more processors may be configured to transmit the depth map information to a computing device associated with the second physical location.

According to a further aspect of the technology, a system associated with a first participant at a first physical location is provided. The system comprises an image capture device configured to capture imagery associated with the first participant at the first physical location, in which the image capture device having a field of view encompassing a first physical medium; a projector configured to display information on the first physical medium located at the first physical location; and a first computing device having one or more processors. The first computing device is operatively coupled to the image capture device and the projector, and the one or more processors are configured to implement any of the methods of operation described herein.

DETAILED DESCRIPTION

Overview

The ease and physical connection of using real markers on a whiteboard, riffing or otherwise brainstorming with people, and sketching creatively without thinking about the tools can be irreplaceable in many interactive contexts. One area of focus of the technology is enabling working with people who are remote while getting the value and ease of working together on things like white-boarding or hands on tutorials. This is done while leveraging the value of digital media at the same time, including having a number of different users actively working on one spot in a drawing or the same section of text in a document simultaneously, while providing the ability to undo, save, or rewind.

One approach uses tools such as a user's mobile phone, a projector and a television, whiteboard, poster board or other physical presentation medium. The mobile phone captures selected information about the user, the projector presents information about other collaborators, and the physical medium provides a focal point for a shared workspace. For instance, the participants can appear as if they were writing on frosted glass from opposing sides of the shared workspace. Participants at each location see writing correctly—no one would see the text, drawings or other details backwards. Distractions in the background environment (e.g., pets or other household members) are not shown. In addition, privacy concerns and video conferencing fatigue can be addressed by the ease of stepping in and out of the shared interactive experience.

Figure 1A:
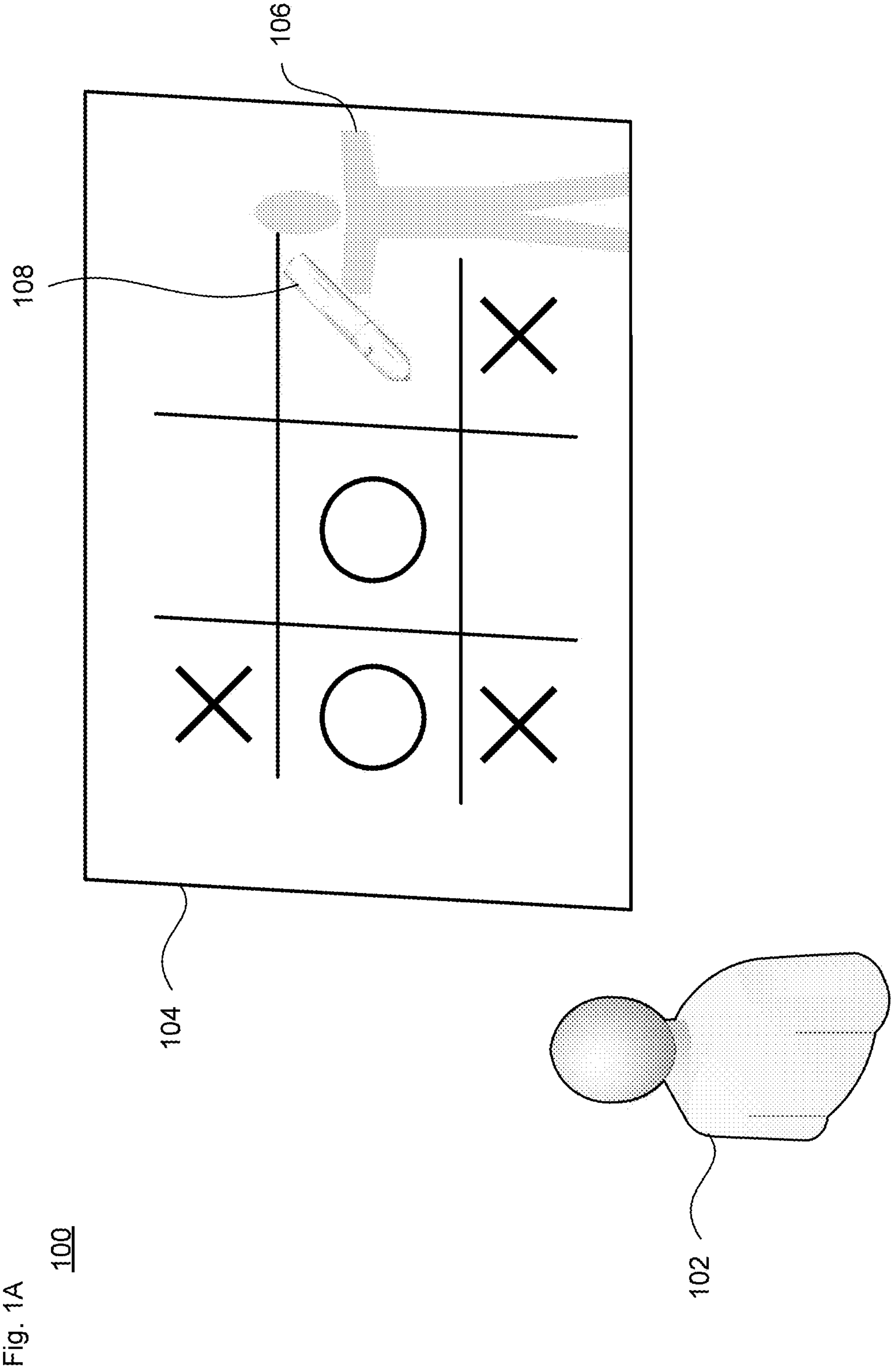
FIGS. 1A-B illustrate a tactile copresence example in accordance with aspects of the technology.

FIG. 1A illustrates an example scenario 100 in which a first participant 102 at a first physical location is playing a game (e.g., tic-tac-toe) with a second participant. In this example, the shared workspace includes a physical medium 104 at the first participant's location. While not shown, there is a separate physical medium at the second participant's location. The content of the physical media at each location are integrated to provide a shared "canvas" upon which all users can work in real-time. According to one scenario, the system configures the shared canvas to have an equivalent (e.g., 1:1) scale, where everyone can have the same view of content presented on the canvas and no information lost, even though the physical media at the different locations may be very different. For instance, the physical medium at the first participant's location may be 42-inch television (e.g., height: 20.5 inches, width: 36.5 inches) while the physical medium at the second participant's location may be a classroom-sized whiteboard (e.g., height: 48 inches, width: 96 inches).

Figure 1B:
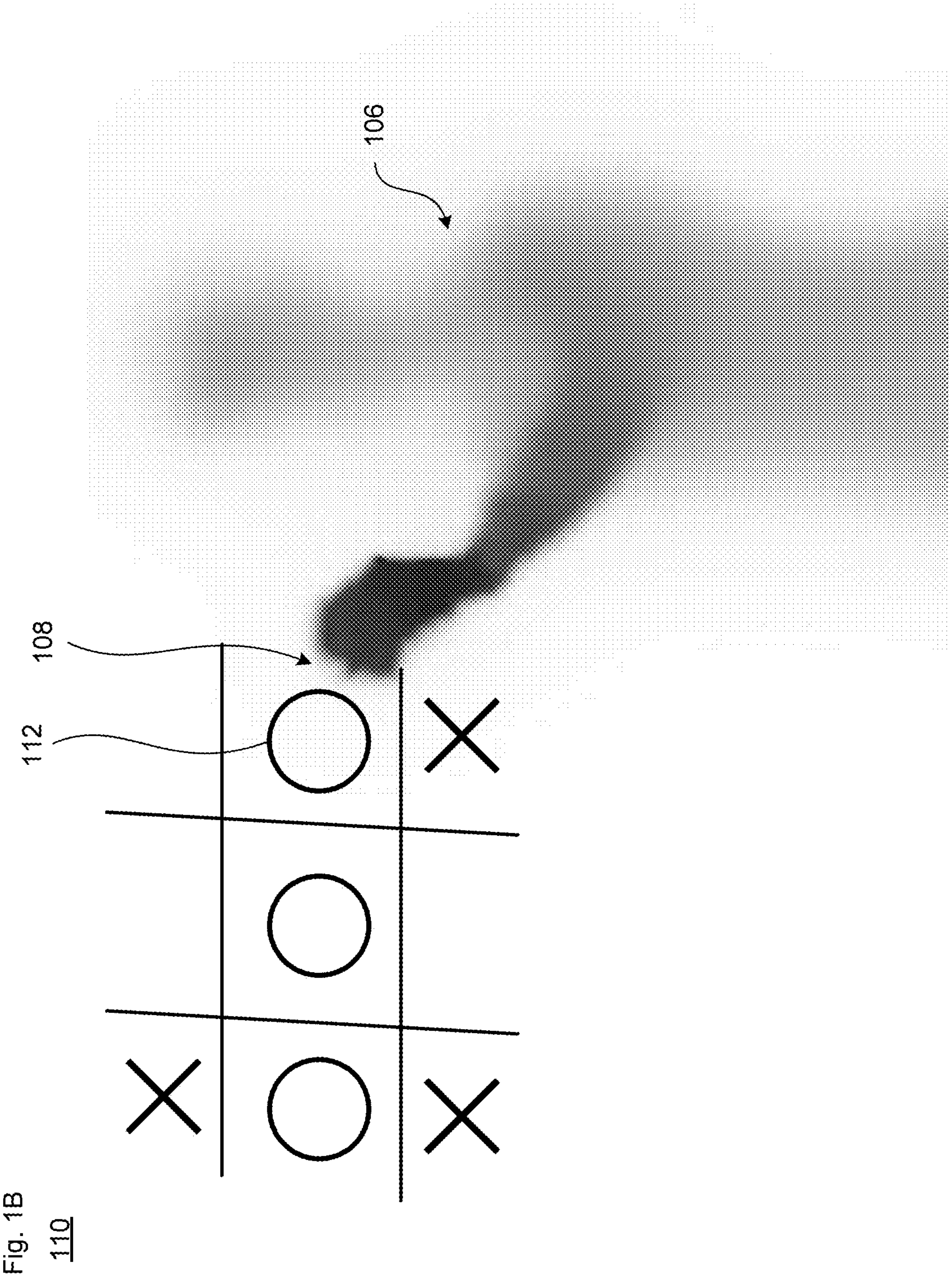

Regardless of equipment differences, the tic-tac-toe board is presented on each physical medium with an equivalent aspect ratio. As shown, a silhouette representation (presence shadow) 106 represents the second participant as presented to the first participant at the first participant's location. In this example, the second participant's representation is shown holding a stylus 108, with which the second participant can mark a "0" in a selected spot while playing the game. This is shown in view 110 of FIG. 1B, where the "0" is drawn as shown at 112. As seen in FIG. 1B, the appearance of the presence shadow projected onto the shared canvas may vary depending on how close that person is to their physical medium (e.g., white board, poster board, large screen display, projection screen, etc.).

System Configurations and Architectures

Figure 2A:
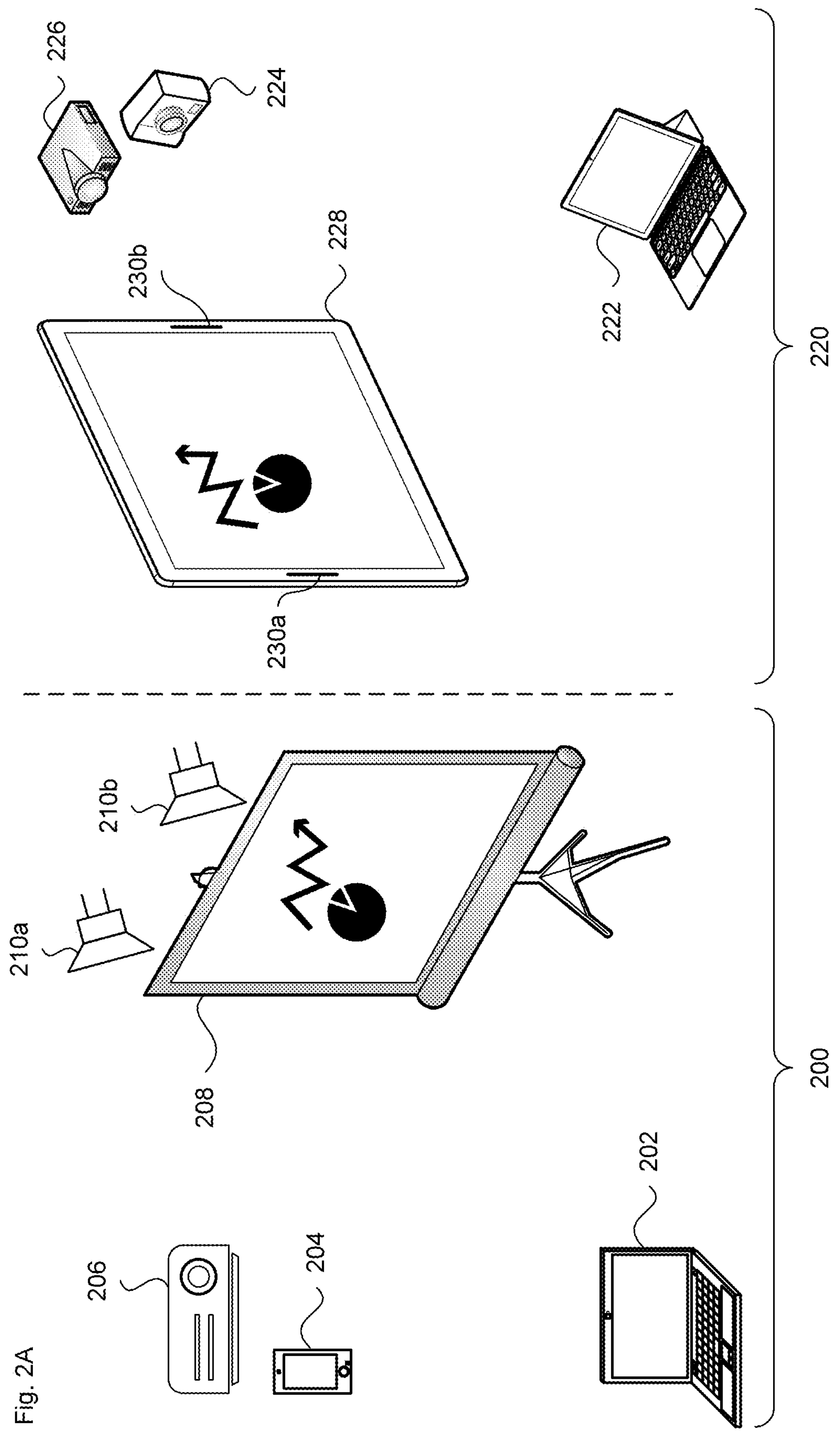
FIGS. 2A-D illustrate functional views of collaborative setups in accordance with aspects of the technology.

FIG. 2A illustrates an exemplary configuration for a two-person remote collaboration scenario. As shown, the first user has a first setup 200 and the second user has a second setup 220. The dotted line between the setups 200 and 220 indicates that the users are at different physical locations (e.g., different rooms, homes, offices, schools, conference rooms or the like). The first user's setup 200 includes a computer 202, an image capture device 204 (e.g., a mobile phone, videoconference camera, webcam, etc.), a projector 206, and a physical medium 208. Speakers 210*a,b* may be used to provide spatial acoustics. Similarly, the second user's setup 220 includes a computer 222, an image capture device 224, a projector 226, and a physical medium 228. Speakers 230*a,b* may be used to provide spatial acoustics that indicate where each other person is positioned in relation to their physical medium. While not shown, one or more microphones may be employed for audio input. By way of example, the microphones may be integrated into the computers, the image capture device, and/or the physical medium, or may be separately placed in one or more locations in the room of each setup.

Figure 2B:
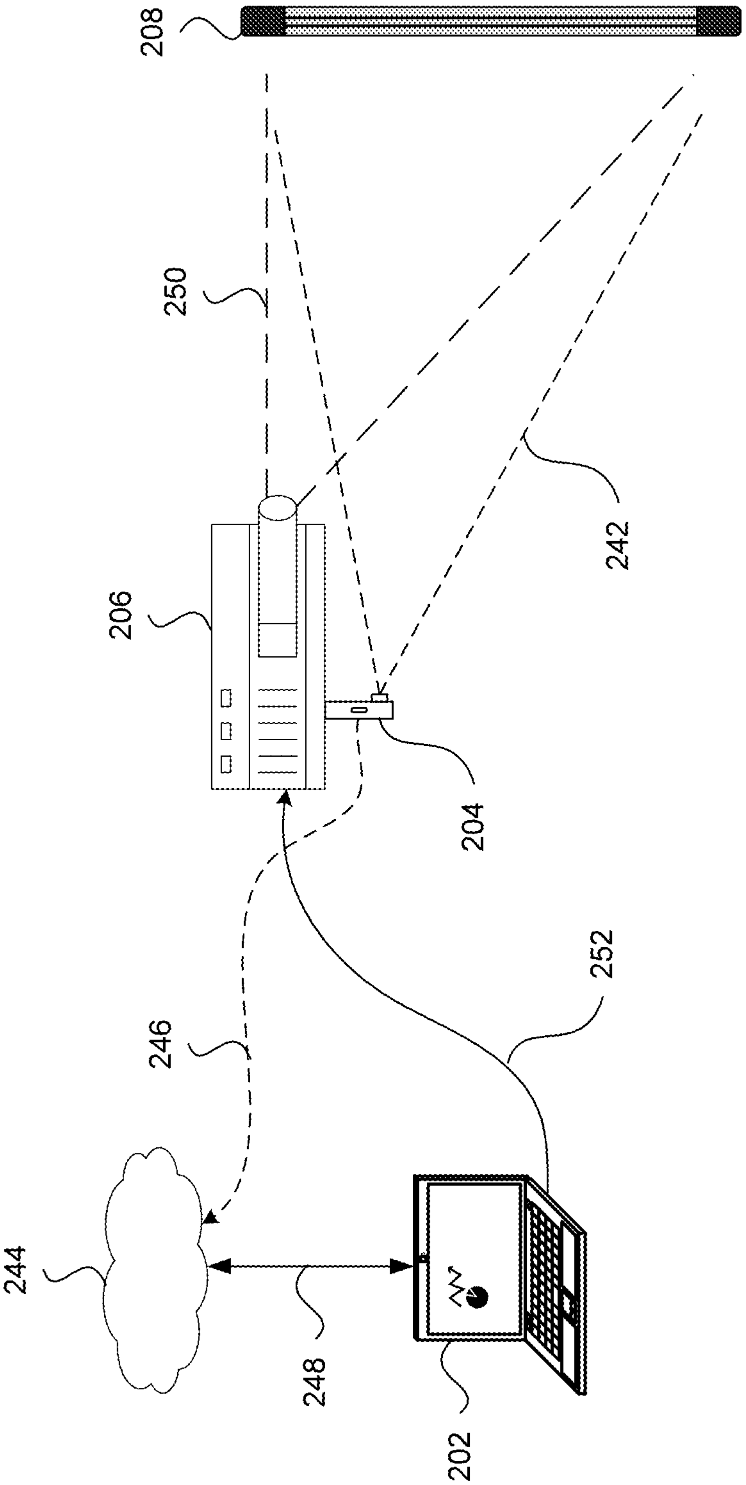

FIG. 2B illustrates a functional view 240 showing the first setup 200. As shown here, the image capture device 204 and the projector 206 may be located adjacent to one another. In one example, the projector is mounted overhead to the ceiling, with the image capture device is positioned below the projector. However, in different setups these components may be arranged at separate locations. For instance, the image capture device can be separately mounted to the ceiling using a multi-degree of freedom mechanical arm. The image capture device should also be arranged so that light from the projector does not adversely impact imagery being captured. The projector should be positioned an optimum distance from the physical medium so that the imagery can be projected to encompass as much of the surface area of the physical medium as possible. The projector should also be positioned so that digital keystoning (image skew) is avoided. Both the projector and the image capture device should be positioned for minimal occlusion of the physical medium, either by the participant(s) in the room or from other things in the room such as a table, chairs, computers, etc.

The image capture device 204 has a field of view 242 configured to capture details of participants standing in front of or near the physical medium 208. Imagery captured by the image capture device 204 can be streamed to the computer 202 and the computer 222 via a network 244 as shown by dash-dot line 246, e.g., using a real-time communication program such as WebRTC. As shown, computer 202 connects to the network 244 via a wired or wireless link 248. The projector 206 has a field of view 250, and is configured to present information from the computer 202 on the physical medium 208 via wired (e.g., an HDMI connection) or wireless link 252. In this configuration, the collaboration can be shown on a display device of the computer and mirrored on the physical medium 208.

Figure 2C:
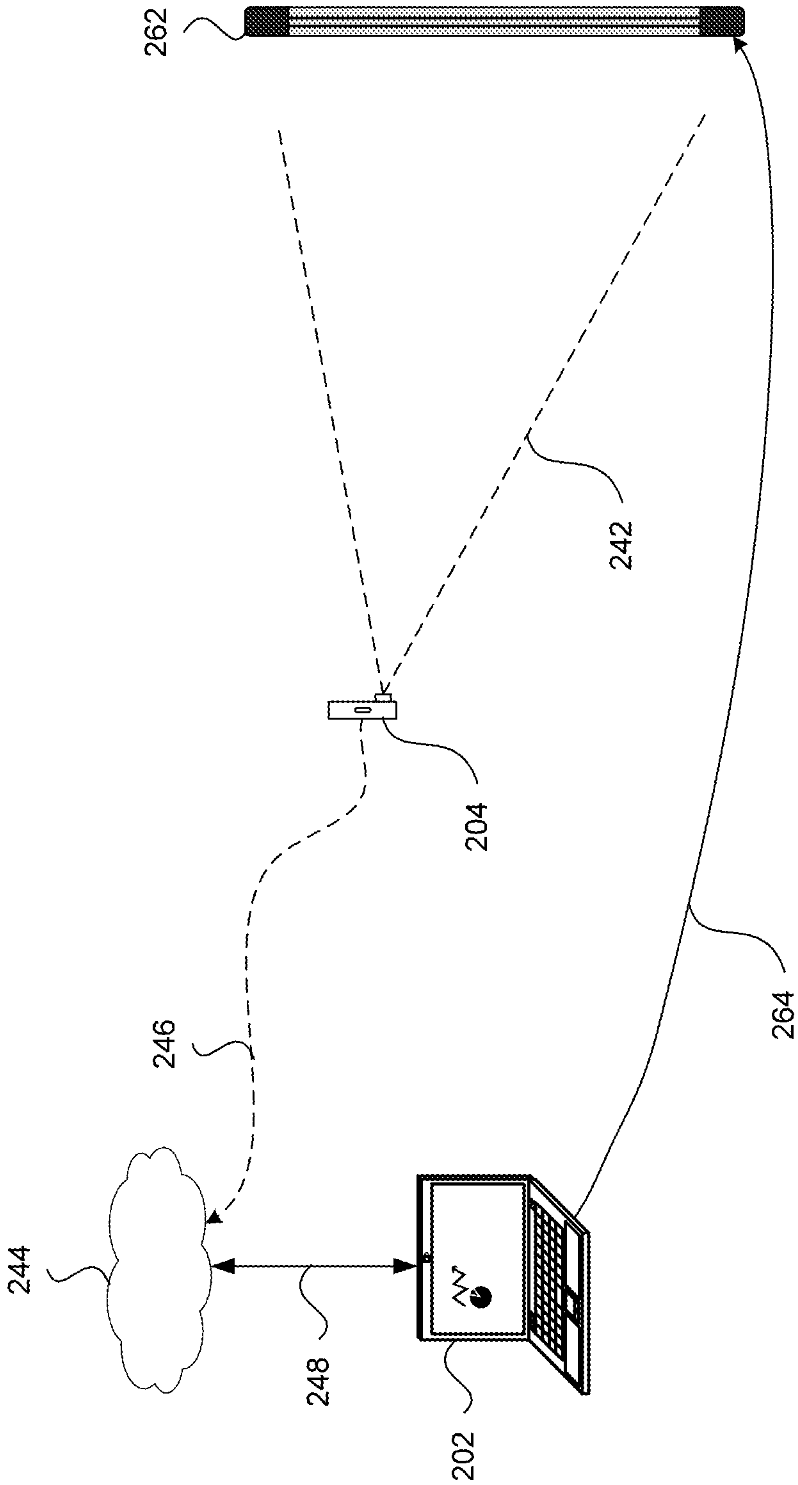
Figure 2D:
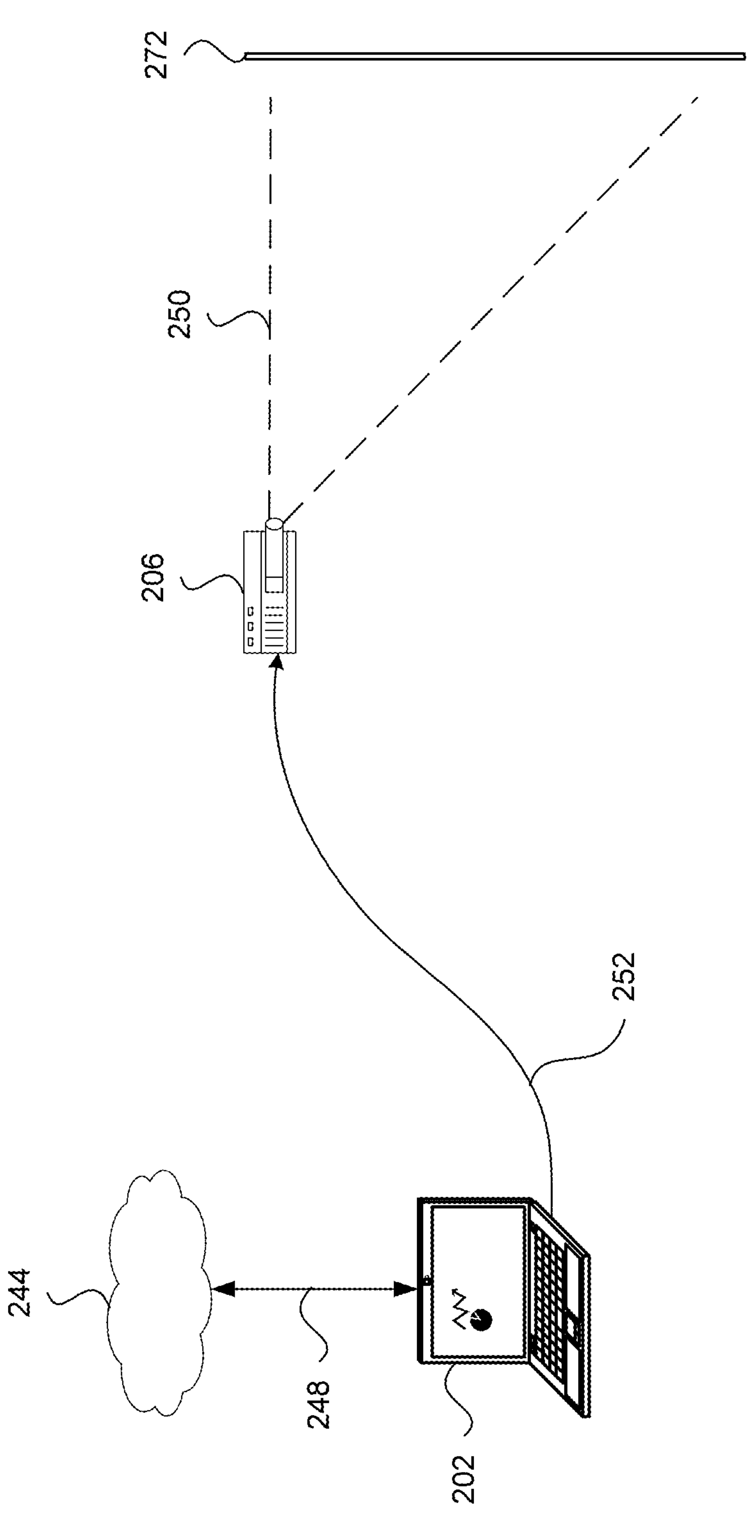

FIG. 2C illustrates a functional view 260 in an alternative configuration, in which a tv or other display 262 acts as the physical medium. In this configuration, the projector is omitted and the computer 202 presents information on the display 262 via link 264. And FIG. 2D illustrates another functional view 270 of a further configuration. Here, the image capture device is omitted, and physical medium 272 is poster board, a sheet of paper, or even just a portion of a wall. This configuration provides an asymmetrical collaborative experience, where the person in this setup is able to see what other participants are doing, but is not able to provide written input on the shared workspace (or have their presence shadow appear to other participants). Audio (speakers and microphones) may be provided in any of these alternative configurations. For instance, in the asymmetric situation, the person may still be able to provide spoken comments without written input or their presence shadow. Other configurations are possible. For instance, the projector and image capture device may be integrated together, or the computer may be omitted such as when using a smart display or smart television. Alternatively, when the image capture device is a mobile phone or other portable client device, it can perform any image processing and provide a web connection without needing the computer. In addition, multiple cameras may be employed, which may be positioned at different locations to minimize or eliminate occlusions caused by a participant standing in front of the physical medium.

Figure 2E:
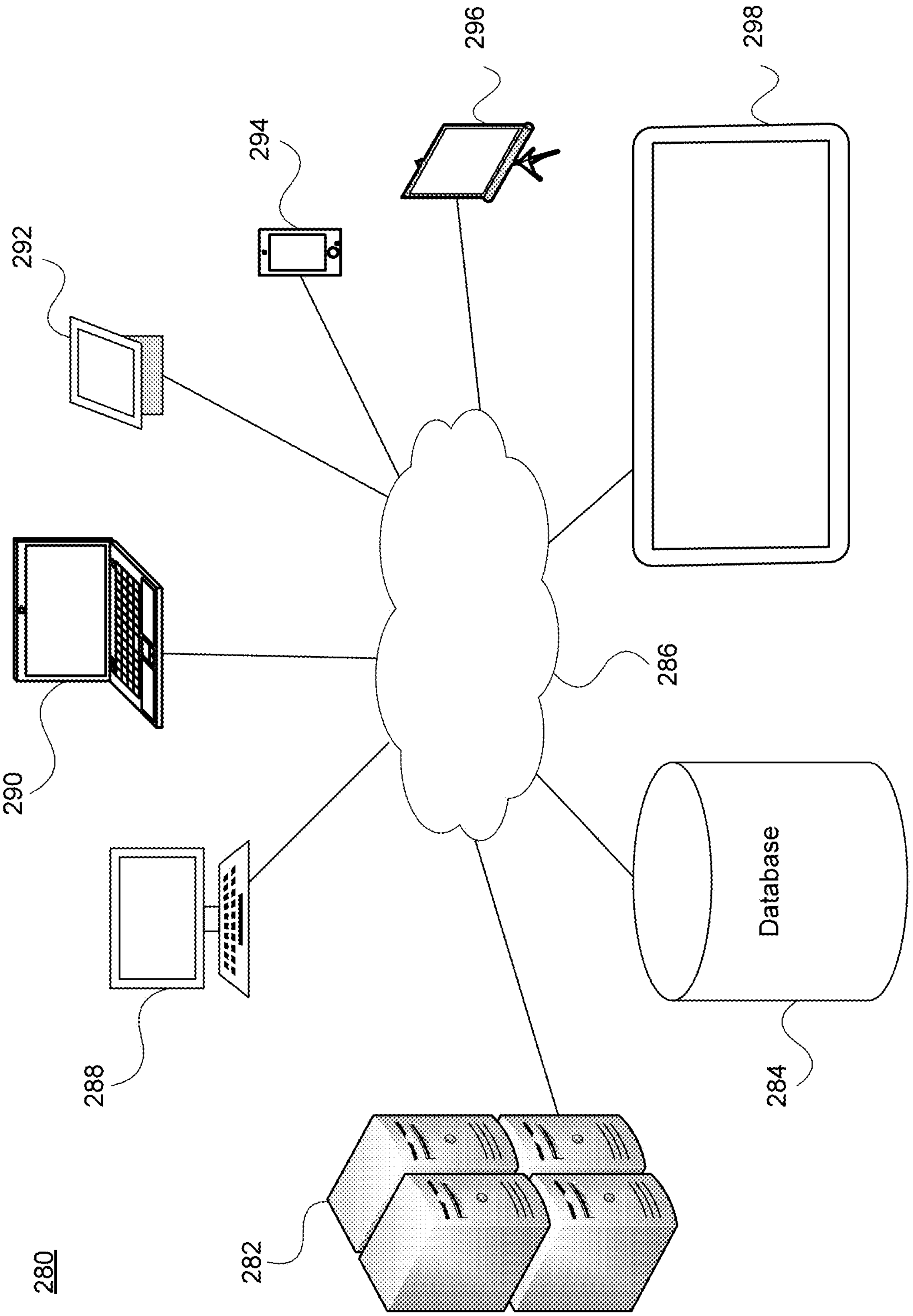
FIGS. 2E-F illustrate a system for use with aspects of the technology.
Figure 2F:
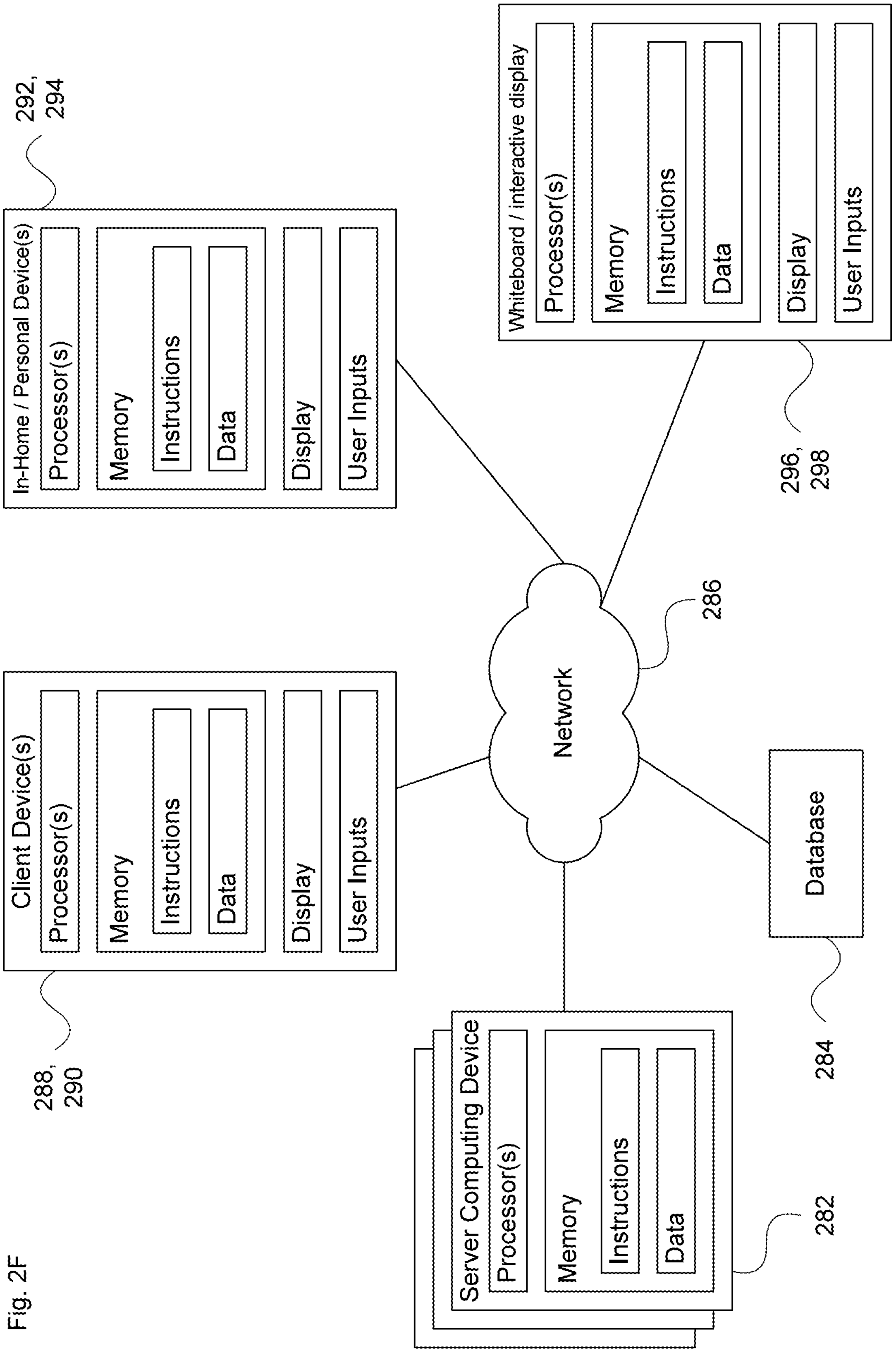

While FIGS. 2A-D illustrate various implementation configurations, FIGS. 2E-F show a general computing architecture 280, in which the computing devices at the different participant locations each employ the same copresence app or other shared program. The app may be a program that is executed locally by the respective client computing devices, or it may be managed remotely such as with a cloud-based app.

In particular, FIGS. 2E and 2F are pictorial and functional diagrams, respectively, of an example architecture 280 that includes a plurality of computing devices and a database connected via a network. For instance, computing device(s) 282 may be a cloud-based server system that provides or otherwise supports one or more copresence apps or other programs. Database 284 may store app data, user profile information, or other information with which the technology may be employed. The server system may access the databases via network 286. Client devices may include one or more of a desktop computer 288, a laptop or tablet PC 290 and in-home devices such as smart display 292. Other client devices may include a personal communication device such as a mobile phone or PDA 294, which may be used to capture imagery of a user's participation at their respective location. Other connected devices can include an interactive whiteboard 296 or a large screen display 298, such as might be used in a classroom, conference room, auditorium or other collaborative gathering space.

In one example, computing device 282 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 282 may include one or more server computing devices that are capable of communicating with any of the computing devices 288-298 via the network 286. This may be done as part of hosting one or more collaborative apps that incorporate copresence in accordance with aspects of the technology.

As shown in FIG. 2F, each of the computing devices 282 and 288-298 may include one or more processors, memory, data and instructions. The memory stores information accessible by the one or more processors, including instructions and data that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs. Alternatively, each processor may be a dedicated device such as an ASIC, graphics processing unit (GPU), tensor processing unit (TPU) or other hardware-based processor. Although FIG. 2F functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 282. Accordingly, references to a processor or computing device will be understood to include references to a collection of processors or computing devices or memories that may or may not operate in parallel.

The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera and/or an externally facing camera to obtain imagery of the physical medium, a mouse, keyboard, touch screen and/or microphone) and one or more display devices that are operable to display information (e.g., text, imagery and/or other graphical elements). Other output devices, such as speaker(s) may also provide information to users.

The user-related computing devices (e.g., 288-298) may communicate with a back-end computing system (e.g., server 282) via one or more networks, such as network 286. The user-related computing devices may also communicate with one another without also communicating with a back-end computing system. The network 286, and intervening nodes, may include various configurations and protocols including short range communication protocols such as Bluetooth™, Bluetooth LE™ the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, each participant's computing device may connect with the computing devices of each of the other participants via the network. Here, the copresence app may be run locally on each computing device. In another example, the server computing device may host a copresence service, and each computing device may communicate with the other computing devices via the server.

Example Scenarios

There are many ways that the present technology may be employed in tactile copresence situations. FIGS. 3A-H illustrate one exemplary scenario. As shown in view 300 of FIG. 3A, two participants are at a first location. Their setup includes image capture device 302, projector 304, physical medium 306 and a pair of speakers 308. In this example, a microphone may be integrated into the image capture device 302 or in the speakers 308, and the physical medium 306 may be a whiteboard or poster board. The image capture device 302 should be positioned in the room to be able to capture imagery of the participants who are in front of the physical medium. The participants at the first location may initiate a working session at the physical medium 306, for instance using a dry erase marker, stylus or other writing tool. While no computer is shown in this view, one may be connected to the projector, image capture device and/or speakers. A teleconference app or other copresence program may be run on the computer.

Another participant at a remote location can also run the copresence program on their computer. As shown in view 310 of FIG. 3B, presence shadow 312 projected onto the physical medium by the projector can indicate that the other participant has joined. While there is an image capture device at the remote location, the system does not show a full video feed of that participant. Rather, the copresence program generates a silhouetted from that imagery, which is projected as that person's presence shadow. Body language and tone are clearly illustrated to participants at the first location without distracting from the collaborative information displayed on the physical medium. This approach also addresses other possible concerns, such as video bandwidth constraints, or providing too much information about the other participant or their location.

Figure 3A:
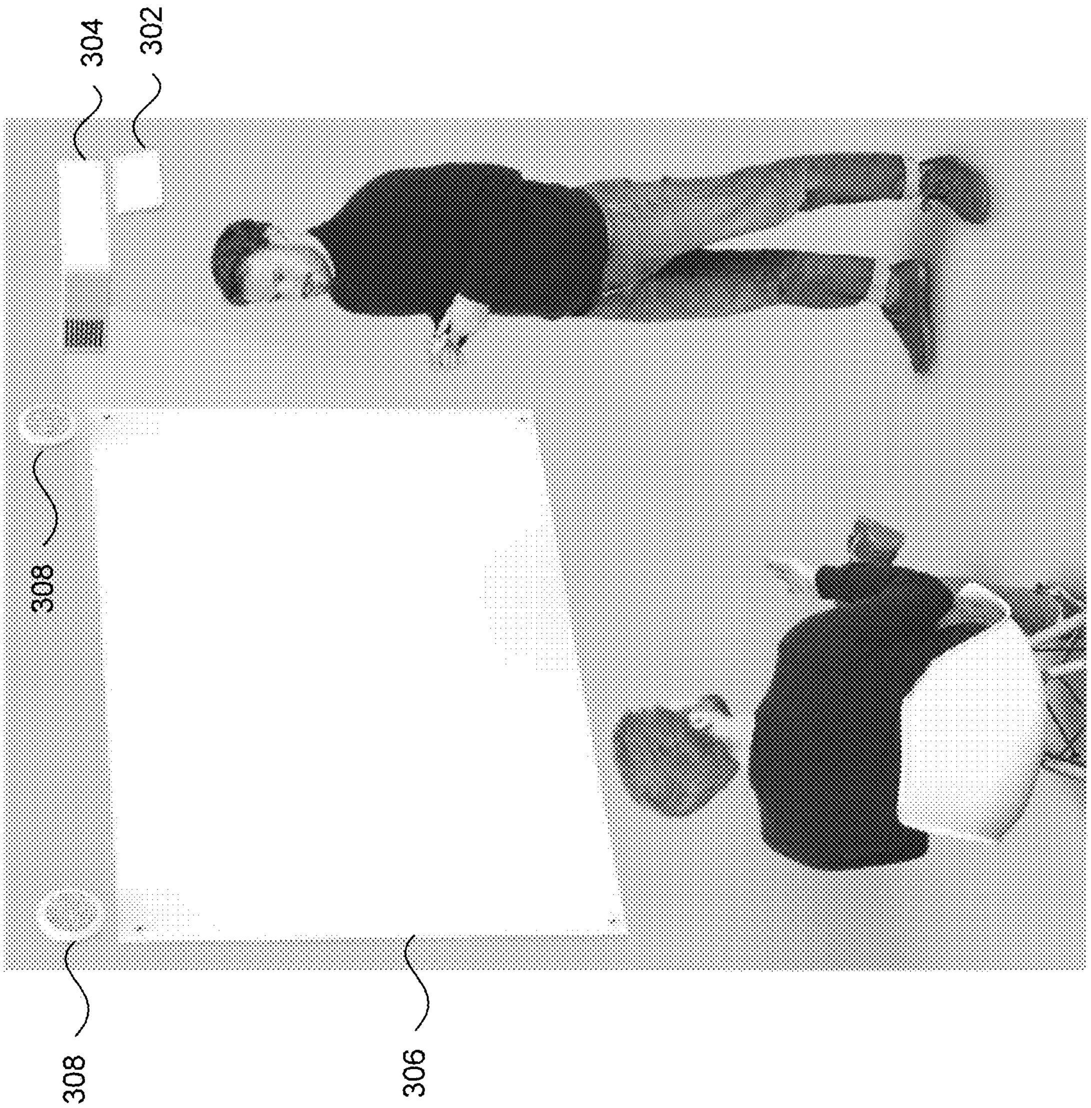
FIGS. 3A-H illustrate an example collaborative scenario in accordance with aspects of the technology.
Figure 3B:
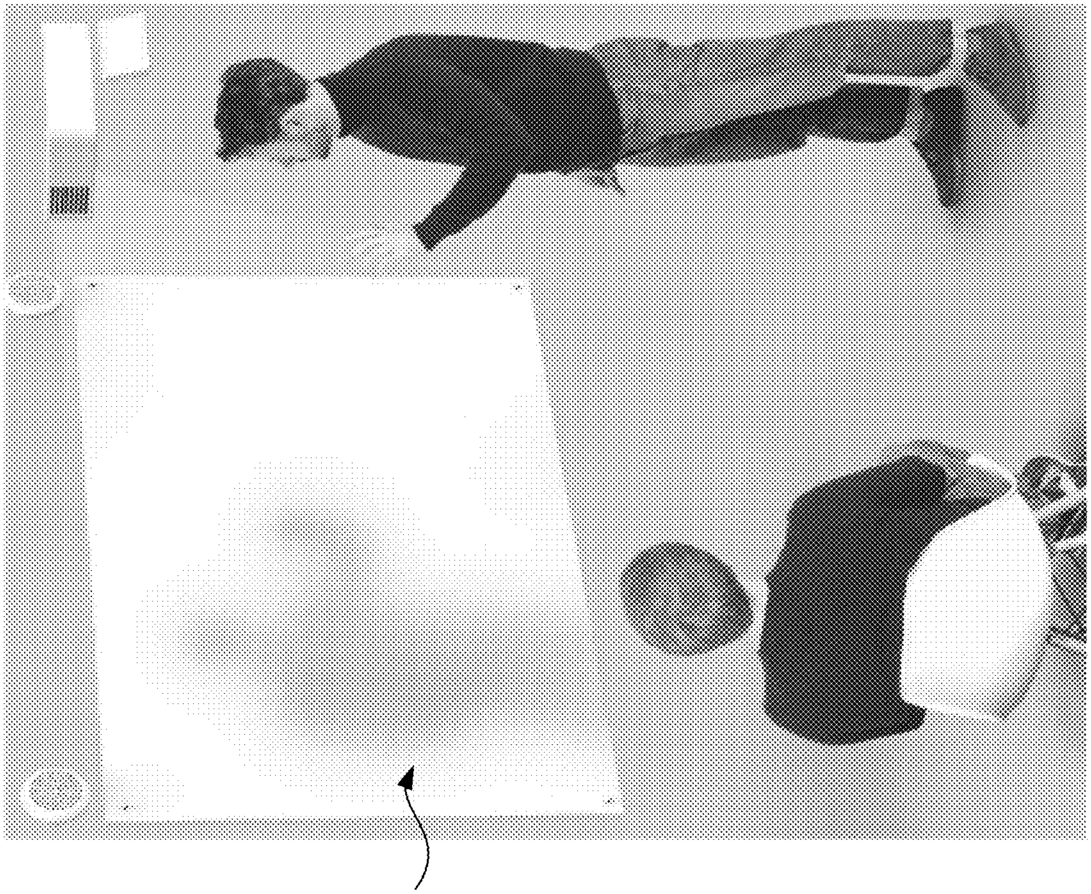
Figure 3C:
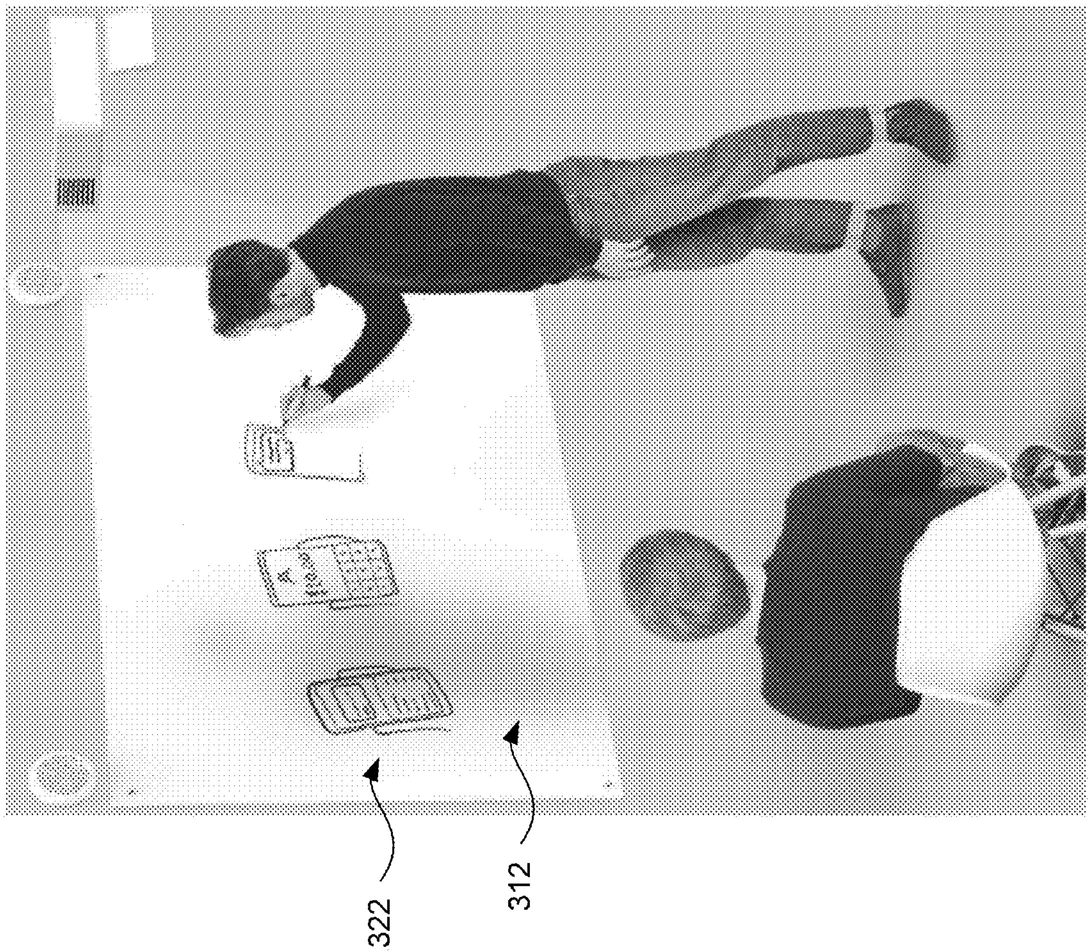
Figure 3D:
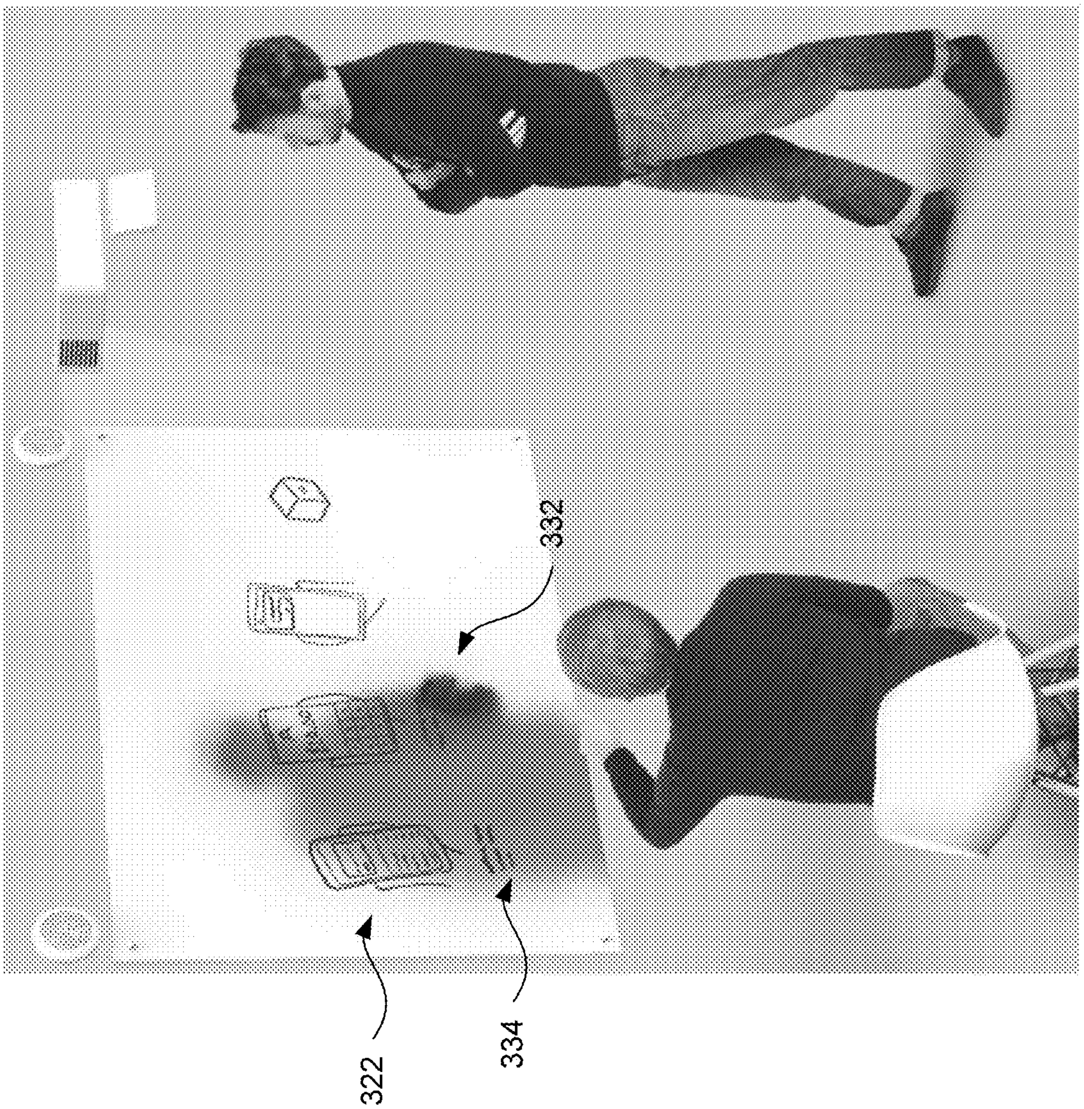
Figure 3E:
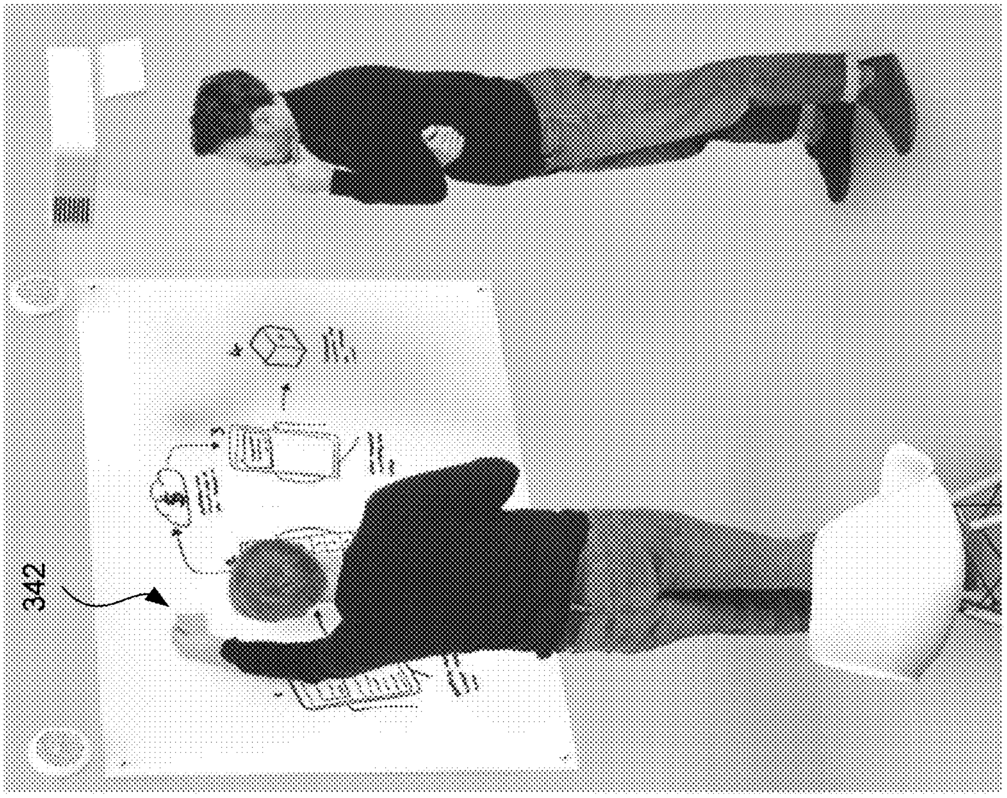
Figure 3F:
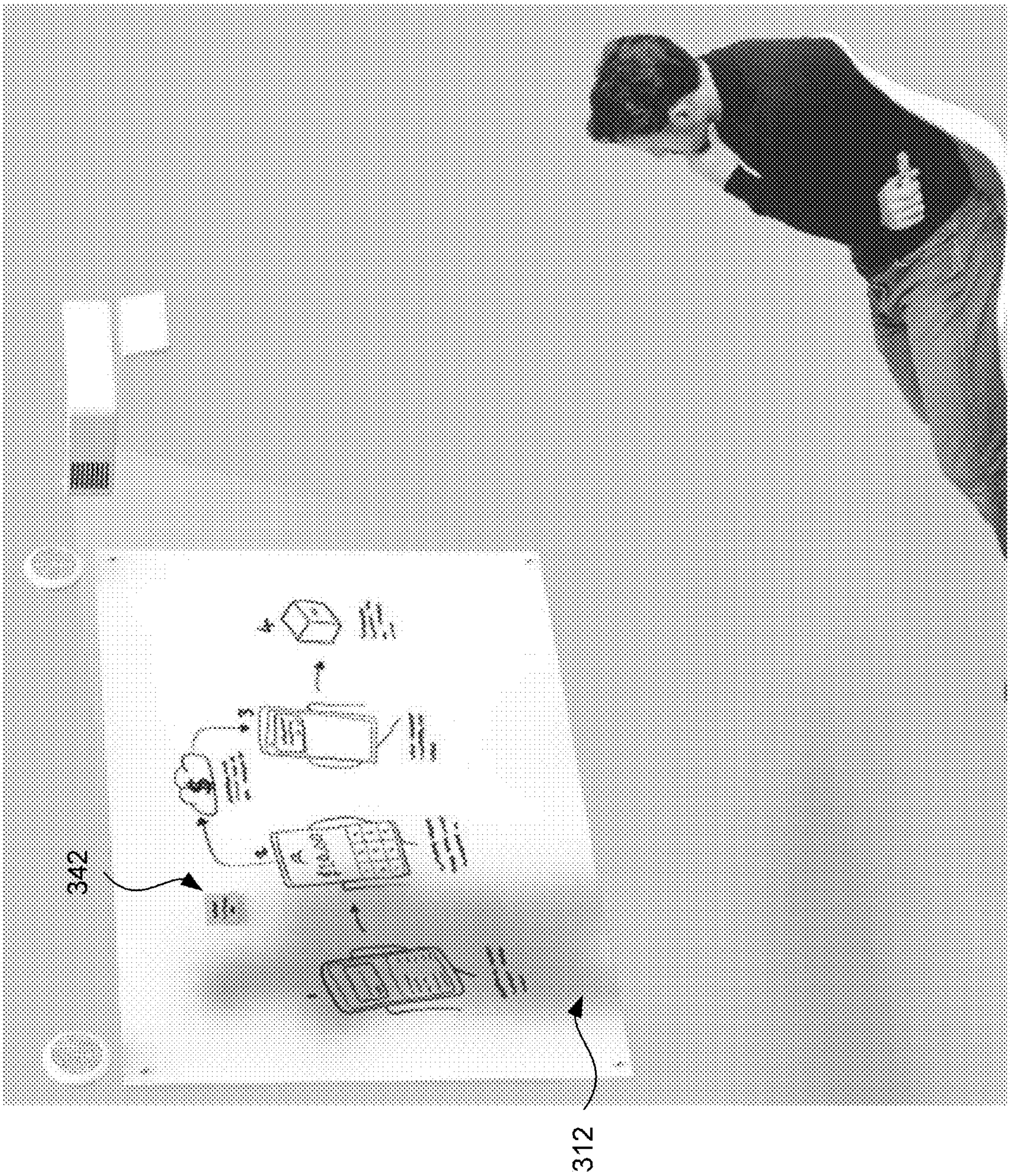
Figure 3G:
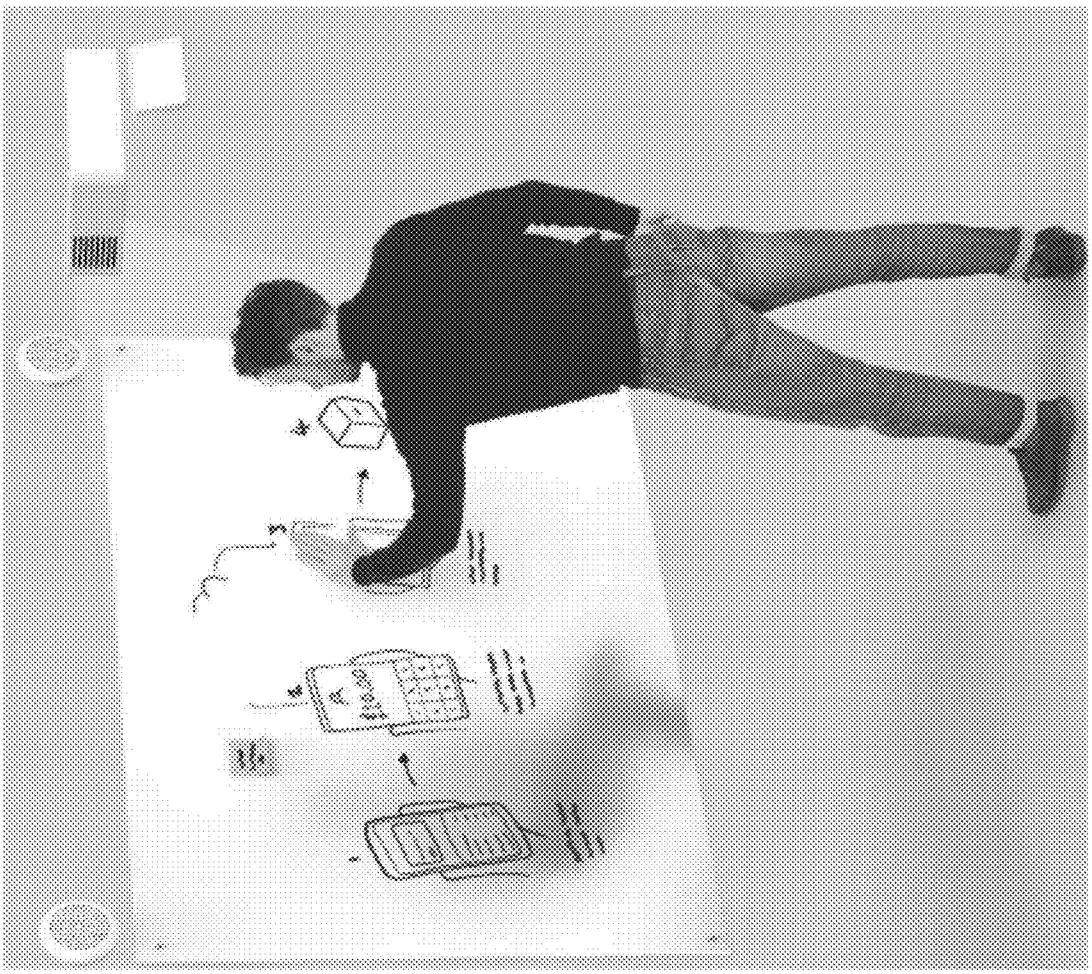

As shown in view 320 of FIG. 3C, one of the participants at the first location is drawing information 322 on the physical medium (e.g., with a dry erase marker). As that participant starts drawing, the information is visible to all participants, so everyone is an equal participant in the discussion. Here, the presence shadow 312 of the remote participant is still shown, for instance watching the content being drawn. And as shown in view 330 of FIG. 3D, the remote participant can also step up to the physical medium at their location and write with their own implement 332, with text or other information 334 being visible to all participants at all locations (having been captured by the image capture device at the remote location.

According to another aspect of the technology, information shared among the participants is not limited to text or images drawn on the physical medium. Anything that can be captured by the image capture device can be employed. So as shown in view 340 of FIG. 3E, a paper sticky note 342 may be added onto the physical medium. And as shown in view 350 of FIG. 3F, the participant(s) at one location can step back away from the physical medium, for instance to consider what others are presenting.

In contrast to conventional video calls, this feature promotes quiet, slow thinking and doing with a calmer interaction mode. Here, if a participant steps back so that they are outside the field of view of their image capture device, then their respective presence shadow's silhouette would not appear on anyone's physical medium of the shared canvas. Once a participant is ready to rejoin the collaboration at the physical medium, as shown in view 360 of FIG. 3G that person can step up or otherwise move into the field of view of their image capture device and begin working at the medium. This approach allows ideas to evolve. Additionally, since the participant is represented only by a silhouette (presence shadow), during the period in which they have left the field of view, it is not necessary to capture and share any representation of the participant until they return. In contrast, if the participant were involved in a video conference, for example the video feed of the participant's surroundings would continue to be provided even if the participant had left the field of view, unless the camera were manually switched off. As such, the bandwidth savings described herein are particularly applicable to this scenario.

Due to the nature of the physical medium, nothing is set in stone, and erasing is just as natural as drawing. Anything that any participant adds to their respective physical medium is integrated into the visualization presented on the shared canvas, and anything that is erased by a participant is removed from the visualization.

Figure 3H:
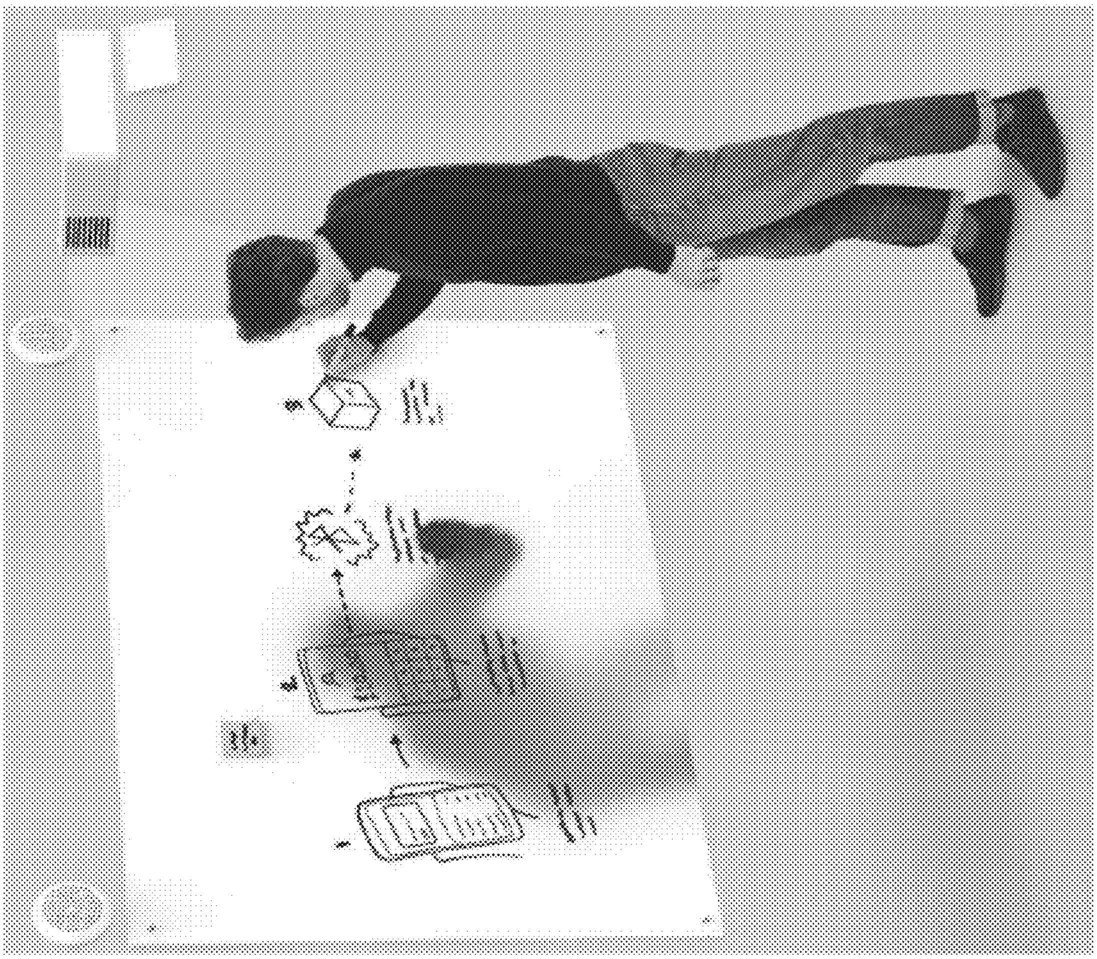

As seen in view 370 of FIG. 3H, participants at each location can simultaneously riff/brainstorm at their respective physical medium, with everyone viewing the results in real time on the shared canvas. The real-time interaction is accomplished via respective wired or wireless connections for each participant to one another via a network such as network 244.

Figure 4:
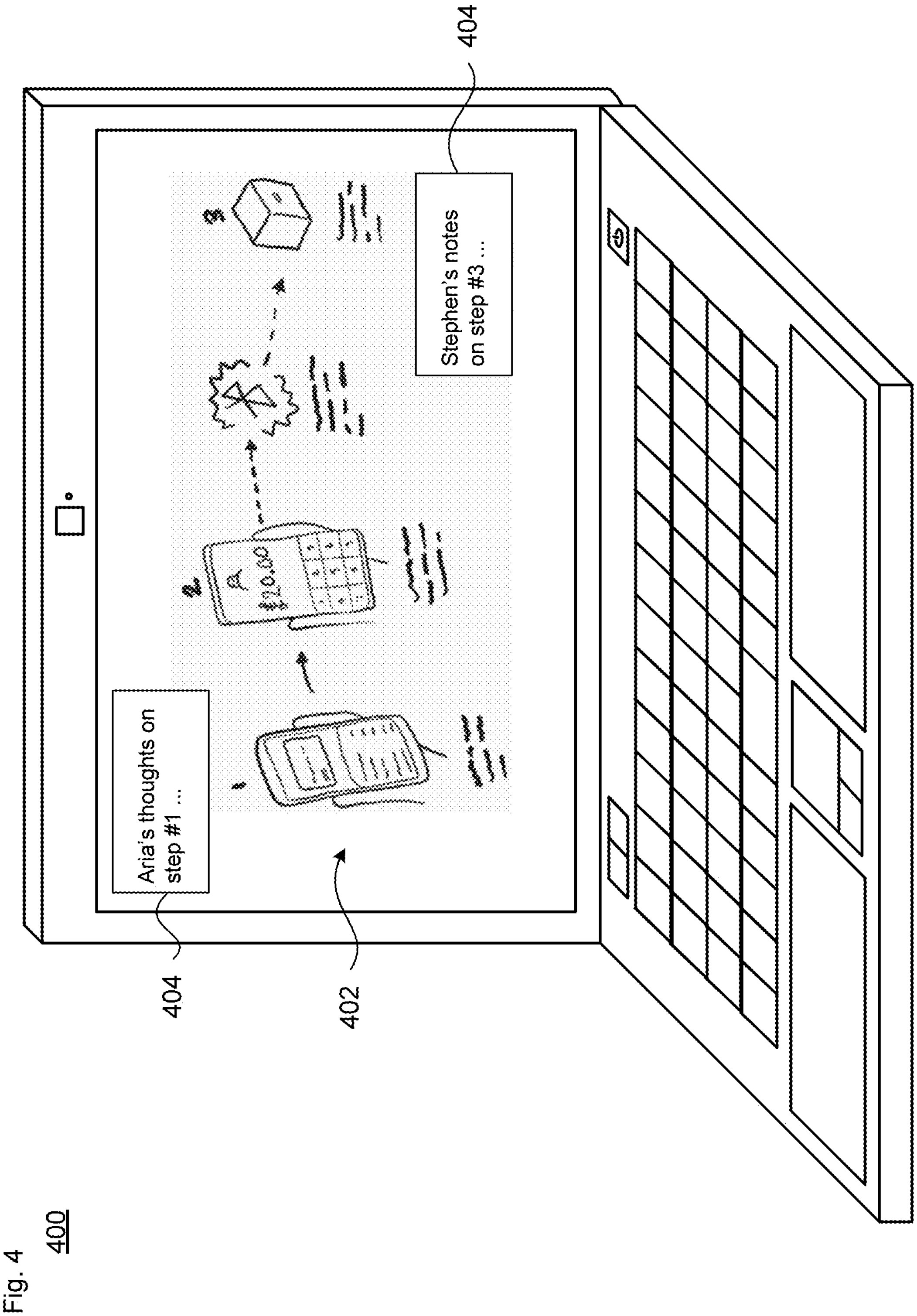
FIG. 4 illustrates a copresence app example in accordance with aspects of the technology.

As shown in example 400 of FIG. 4, the copresence app can show everything that is on the shared canvas on the displays of the computing devices, as illustrated by arrow 402. The app may automatically create "bookmarks" of the collaborative session, for instance stored in a remote system such as a cloud storage system. By way of example only, the bookmarks could be generated periodically, such as every minute or every 5 minutes (or more or less), every time a participant finishes interacting with the shared canvas, whenever someone steps back from the shared canvas, etc. The bookmarks can be easily imported into tools like a presentation application, in order to build on and communicate the ideas more widely. In addition, the app allows a user to make notes on their local computing device, such as electronic sticky notes 404.

Silhouette Representations/Presence Shadows

Figure 5A:
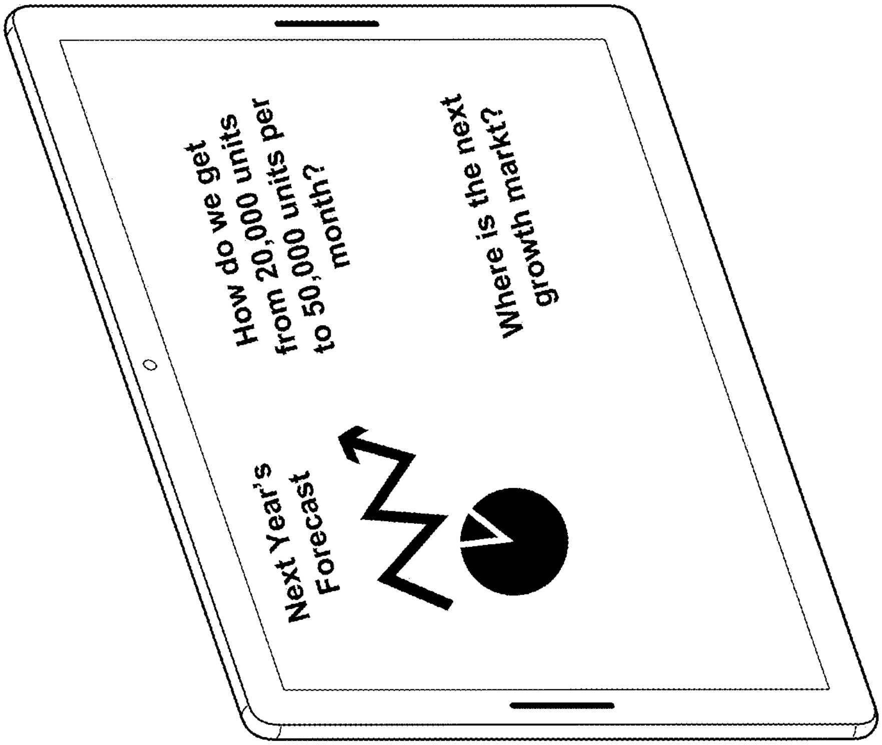
FIGS. 5A-E illustrate image information for silhouette generation in accordance with aspects of the technology.
Figure 5B:
Figure 5C:
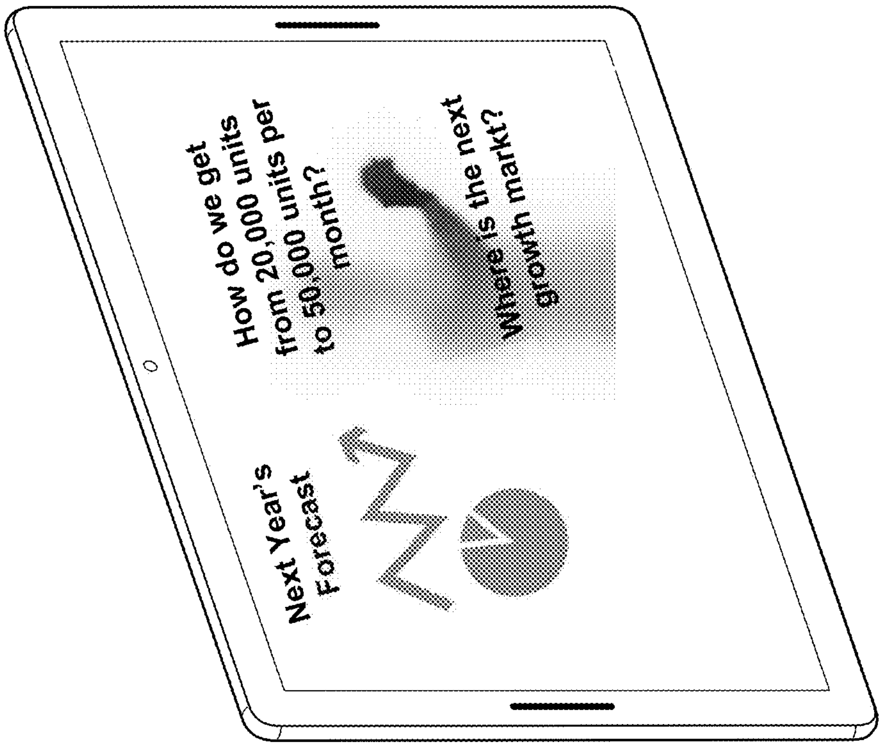

One highly beneficial aspect of the technology is that the content shown on the shared workspace is presented with high fidelity in high resolution (e.g., at least 250-300 pixels per inch), while the users' representations are intentionally created to have a lower resolution that appears as silhouettes (e.g., no more than 150-250 pixels per inch). Regardless, the silhouettes are able to convey meaningful information about how the users are interacting in the collaborative experience. For instance, view 500 of FIG. 5A shows a set of exemplary content that would be presented to each participant at their location. View 510 of FIG. 5B illustrates a shadow presence that is generated by the system for a given user at one location. View 520 illustrates the integration of the high resolution content and the lower resolution shadow presence. It can be seen that the content is clearly discernable even though the user who has stepped up to their particular medium has their shadow presence also visible to other participants.

To create the visuals for the presence shadows, the image capture device includes a depth camera. This can be a depth camera on a mobile phone, a stand-alone camera unit that has two or more imaging units, or separate cameras that in combination can provide the depth information. In addition for use in generating the presence shadows, the information from the depth camera can be used to detect (and correct for) occlusion of a portion of the physical medium.

In other scenarios, in addition to information from the image capture device, other information regarding depth may also be provided by a radar sensor, a lidar sensor, an acoustical sensor (e.g., sonar) and/or any combination thereof. By way of example, such information may be used to provide additional details about user gestures either at or away from the shared canvas (e.g., the positioning and/or spacing of the fingers, how a pencil or brush is being held, etc.), used to overcome possible occlusion of the image capture device, or otherwise enrich the information used to create a participant's shadow presence. Thus, using one of these other types of sensors can serve in detecting and helping to visualize a more abstract approximation of presence. For instance, location and pose information about the person can be used to generate a visualization in which their shadow changes from a humanoid shape to a dot or blob as the person moves away (and the reverse as the person moves closer), which will still move in sync with the person at the other end. This type of visualization would retain a sense of copresence but without the fidelity of a full body shadow.

Figure 5D:
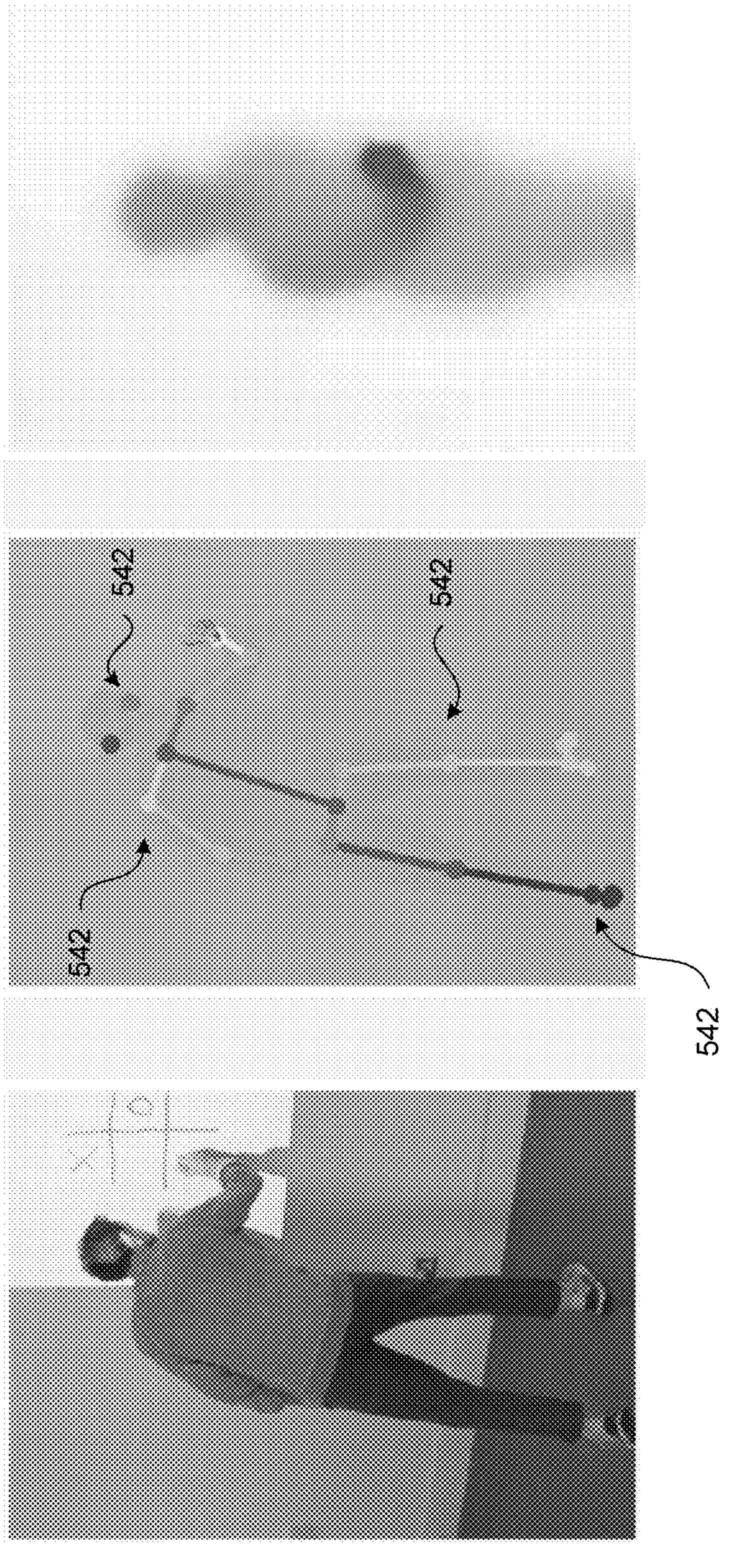

FIG. 5D illustrates three views that show an example for creation of a silhouette representation of the person's body. First, as seen in view 530, a raw image of the person is captured. Then, as seen in view 540, skeleton coordinates 542 of various points along the person's body are determined (e.g., joints, head features, hand features, arm features, leg features, foot features, etc.), which is used for pose estimation. By way of example, the skeleton coordinates may be determined using a machine learning image processing model such as PoseNet. From this information at a first person's location, as seen in view 550 a 3D reprojection is created on the shared canvas at another person's location. According to one scenario, in the case where a copresence application/service is hosted centrally, it may be beneficial to transmit only skeleton coordinates from the participant's respective locations to the service so that the pose estimation is done centrally, in contrast to sending estimated pose information to the service. This can result in reduced transmission overhead and avoid the need for dedicated computing resources at each participant's location, which may be particularly beneficial when there is a large number of participants (e.g., 10, 20 or more participants).

Figure 5E:
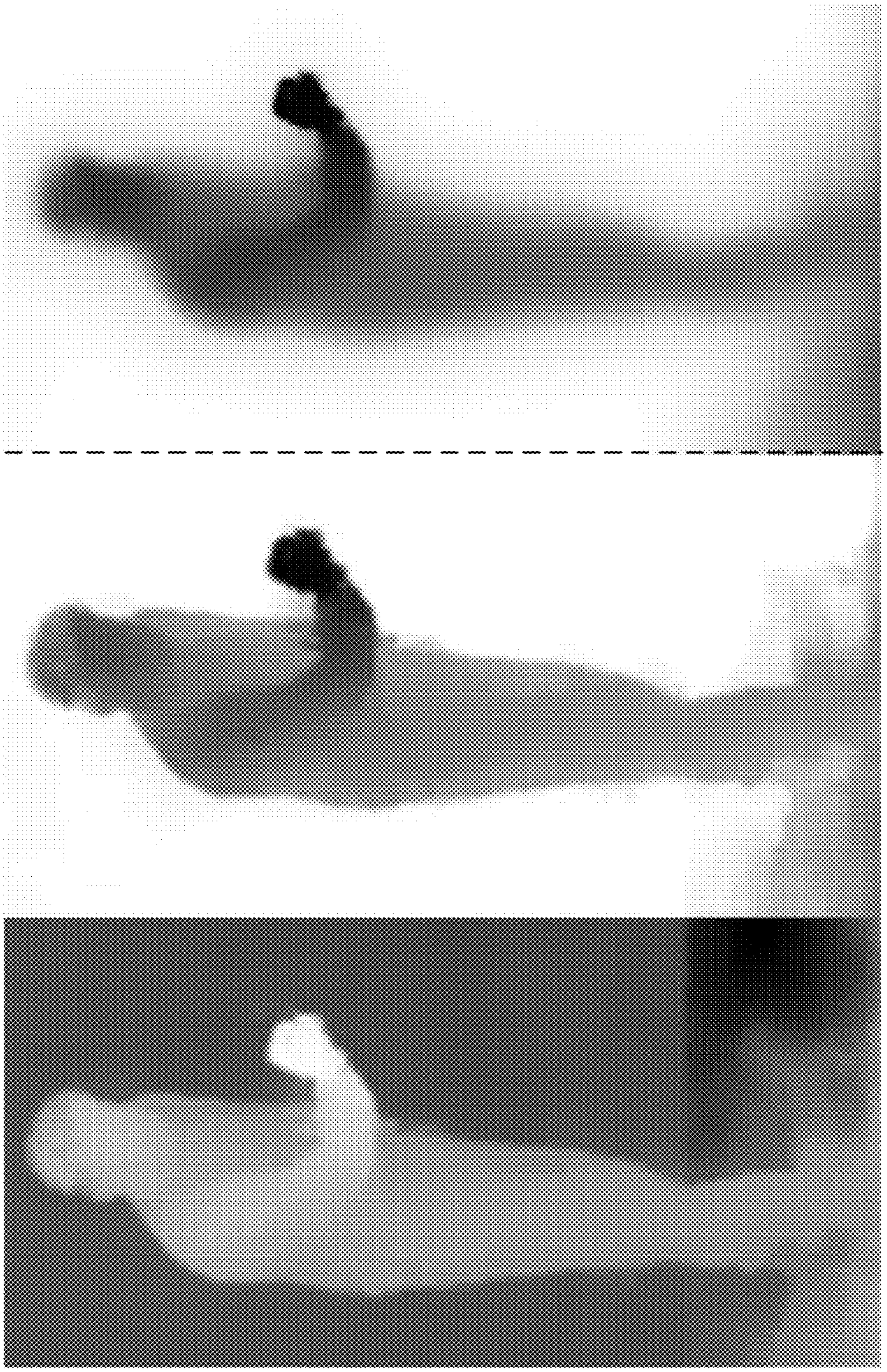

Presence shadow generation can be done as follows. As shown in view 560 of FIG. 5E, depth map information is extracted from the original image. Then, this depth map information is inverted and levels are set. For instance, as seen in view 570, background details are set to one color (here: white), while foreground details at or near the surface of the physical medium (e.g., a whiteboard) are set to a visually contrasting color (here: black). Then, as seen with respect to view 580, features are blurred or otherwise made more diffuse according to their depth. So while the person's hand and arm are close and are presented sharply, the person's torso and legs are blurred. However, even with the blurring, the system achieves a look and feel user experience that creates body language fidelity. This is accomplished at low latency (e.g., updates can be made on a frame-by-frame basis from the original video) so that real-time riffing/collaboration is enhanced. According to one scenario, a camera (e.g., 204 in FIG. 2B) may be positioned approximately 1.5-2.0 meters away from the drawing surface of the physical medium (e.g., 208 in FIG. 2B). The pixels at the drawing surface are set to black. In this scenario, the pixels gradually transition to white at about 3.5-4.0 meters from the drawing surface, and anything further than this is set to white. Thus, in this scenario there is a linear gradient in color value from black to white over the range 0.0 to about 1.8-2.2 meters from the physical medium. In this scenario, blurring may follow a similar function, with zero blur at the drawing surface, linearly transitioning from a 0 pixel radius blur to approximately a 150-250 pixel blur over the same range. In other scenarios, the pixel transitions and/or blurring may have different ranges. Additionally, the transitions and/or blurring may be non-linear or have step function-type changes rather than being linear over a given range. In still further scenarios, the presence shadow is presented while the person is within a threshold distance of the physical medium (e.g., within 1.0-1.5 meters), and not presented when the person is no longer within the threshold distance. The color changes and/or blurring may be set automatically by a collaboration application or may be adjustable by the participants.

Figure 6C:
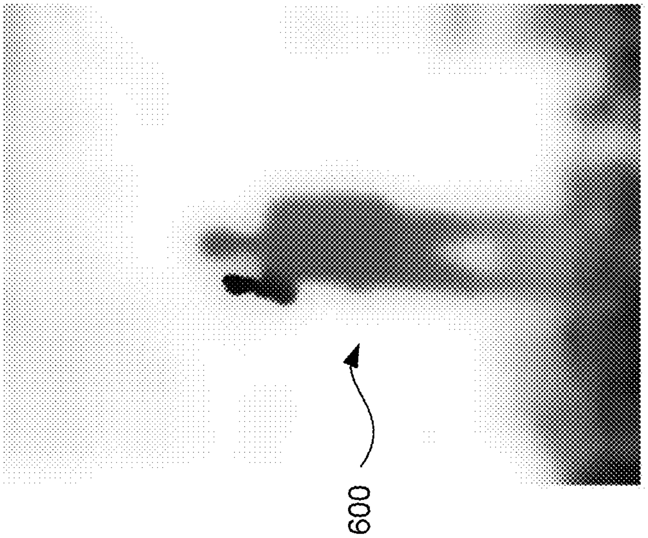
FIGS. 6A-J illustrate presence shadow examples in accordance with aspects of the technology.
Figure 6B:
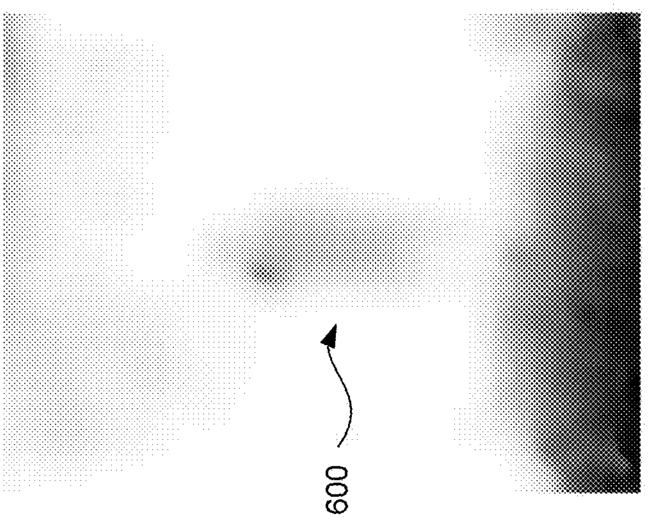
Figure 6A:
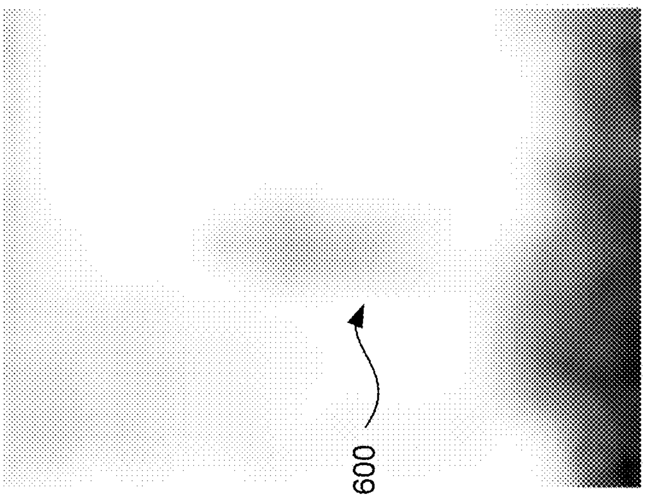
Figure 6F:
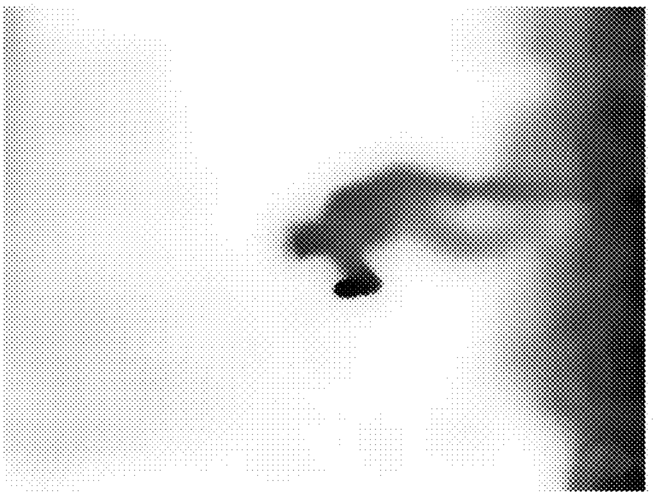
Figure 6E:
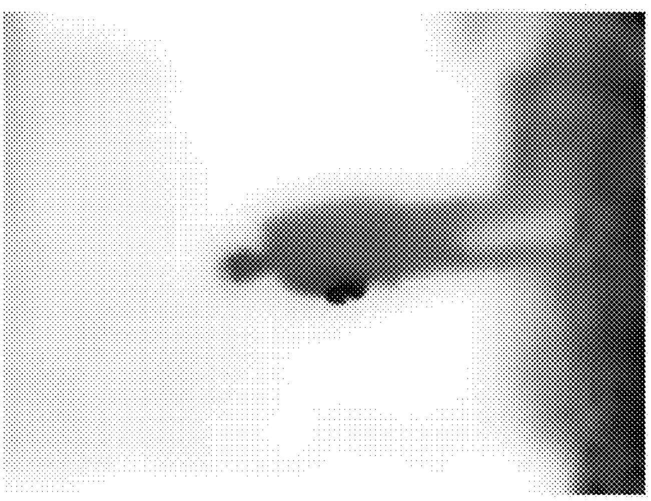
Figure 6D:
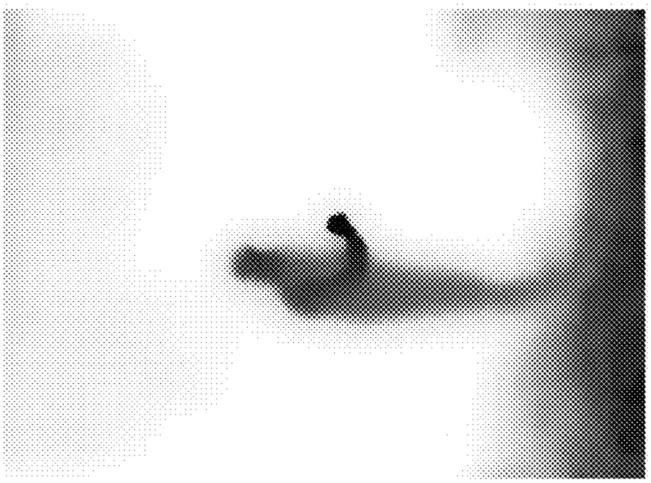
Figure 6I:
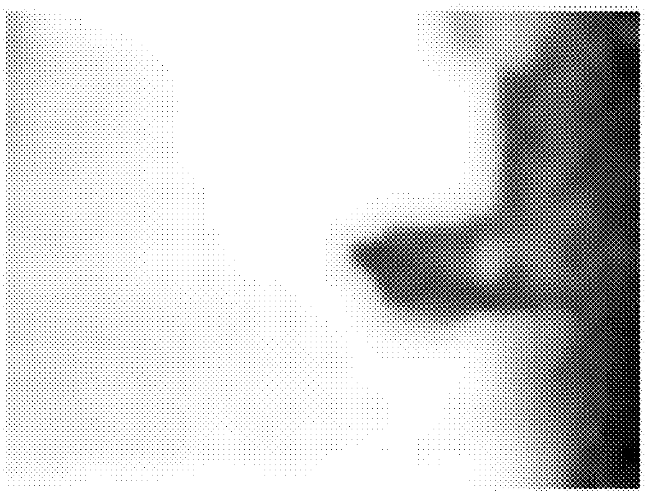
Figure 6H:
Figure 6G:
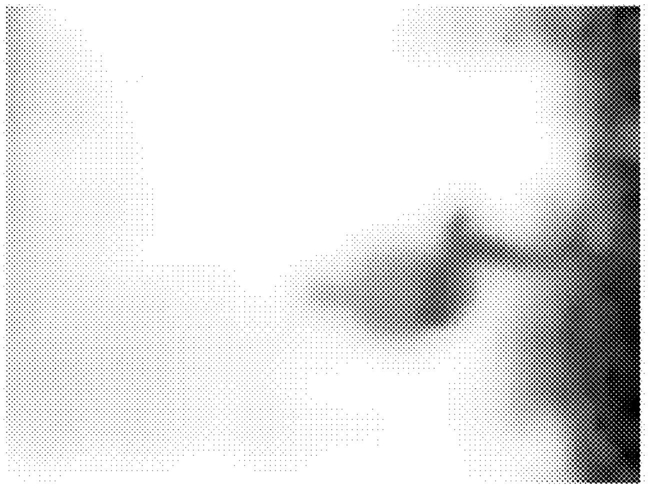

FIGS. 6A-J illustrate examples of a participant's presence shadow may change in relation to the shared medium as the person interacts in the collaboration. For instance, as the participant starts their interaction, they move towards their physical medium. Once they are within a threshold distance to the physical medium and are within the field of view of the image capture device at their location, a presence shadow 600 for that person appears on the shared canvas for all participants, as shown in FIG. 6A. As the person gets closer to their physical medium, the sharpness of their presence shadow increases, as shown in FIGS. 6B and 6C. FIGS. 6D-F present the presence shadow in a way to indicate not only that the person is writing or drawing on their physical medium, but also indicates the person's body position relative to the physical medium (the person's pose). Should the person step back or otherwise move away from their physical medium, their presence shadow becomes less sharp while still providing contextual information to the other participants. By way of example, as seen in FIGS. 6G-I, the presence shadow indicates that the person is sitting down, for instance to contemplate the information on the shared canvas. Here, the presence shadow is able to convey the person's mood or state of mind.

In addition to visual changes to the presence shadow, changes may also be made to the audio input associated with a given participant. For instance, when a participant is not within a threshold distance (e.g., 2-5 feet, or more or less) from the shared canvas, or is otherwise outside the field of view of their image capture device, the audio feed for that person may be automatically muted. Once the person comes within the threshold distance or the field of view, then the audio may be turned on. The audio volume may also be tuned based on the actual distance to the physical medium, so that the volume for a particular person becomes louder the closer they are and/or fades as they move back from the physical medium. The balance of acoustical signals produced by left and right speakers could also track the lateral position of the person. In another example, the participant may turn their audio on or off using the image capture device as a tool, for instance by looking at a camera or making a gesture to enable the microphone or mute it.

Figure 6J:
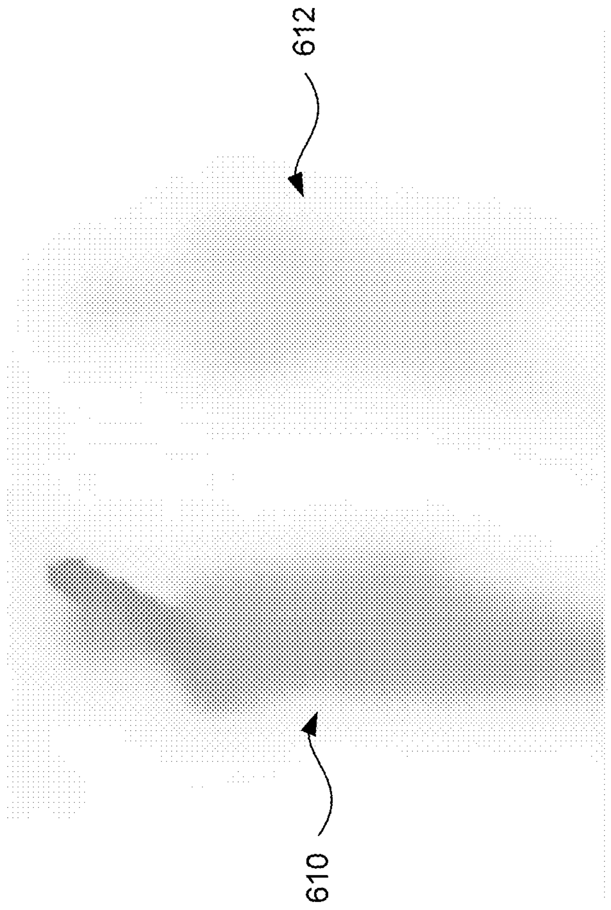

FIG. 6J illustrates another example, in which the presence shadows 610 and 612 of multiple participants are shown. While it may be readily apparent which presence shadow is associated with a given participant, e.g., due to different body sizes, types, etc., there are different ways the system can augment the presence shadows for each person. By way of example, a different color, shading, chroma, glossiness and/or texture may be assigned to or selected by each person (e.g., according to a user profile or as part of an app user interface). Participant names, tags, insignia or other textual or graphical indicators could be placed on or adjacent to different presence shadows. In addition, when a person is speaking, their presence shadow could be highlighted, outlined, pulsate or otherwise changed in appearance. Any or all of these differentiators may be employed. In one example, at least one differentiator may be employed when a person joins the collaborative app, and then having the differentiator change after a selected amount of time (e.g., 5-10 seconds) or once another person joins.

Calibration and Mapping

It is desirable for the participants at each location to see the same things on their physical medium that is common to the other participants, in particular the textual and/or graphical information that everyone is collaborating on. Everyone should ideally see this information in the same way (e.g., with a 1:1 scale), so that everyone has an equivalent view and no information is lost. The people at each location will also see the presence shadows of the other participants (but not their own). However, imaging issues such as visual echo and feedback can adversely impact streaming video between imaging device—projector setups. Thus, calibration may be performed prior to launching a copresence app, or upon launching the app.

Figure 7A:
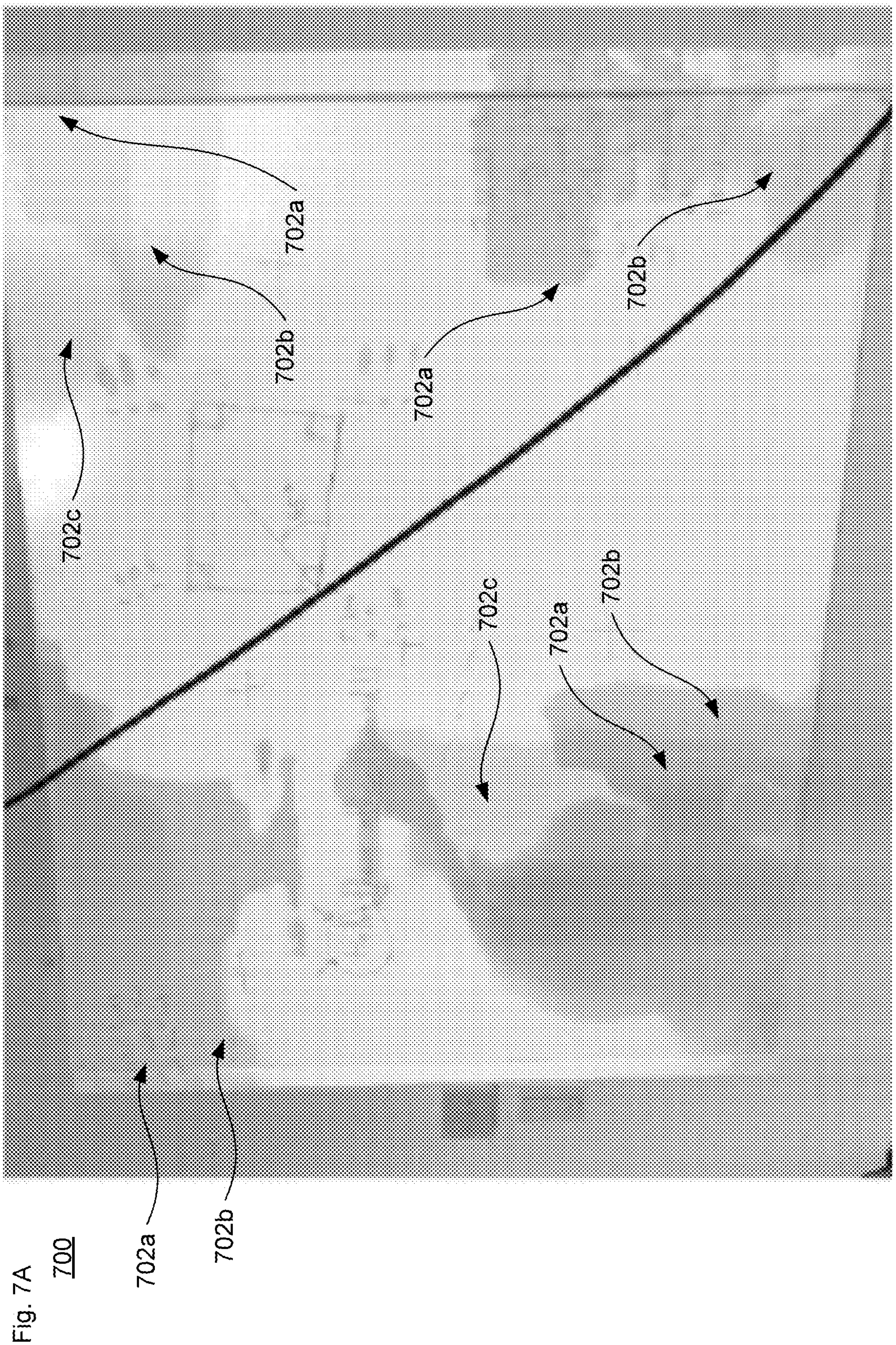
FIGS. 7A-D illustrate image correction examples in accordance with aspects of the technology.
Figure 7B:
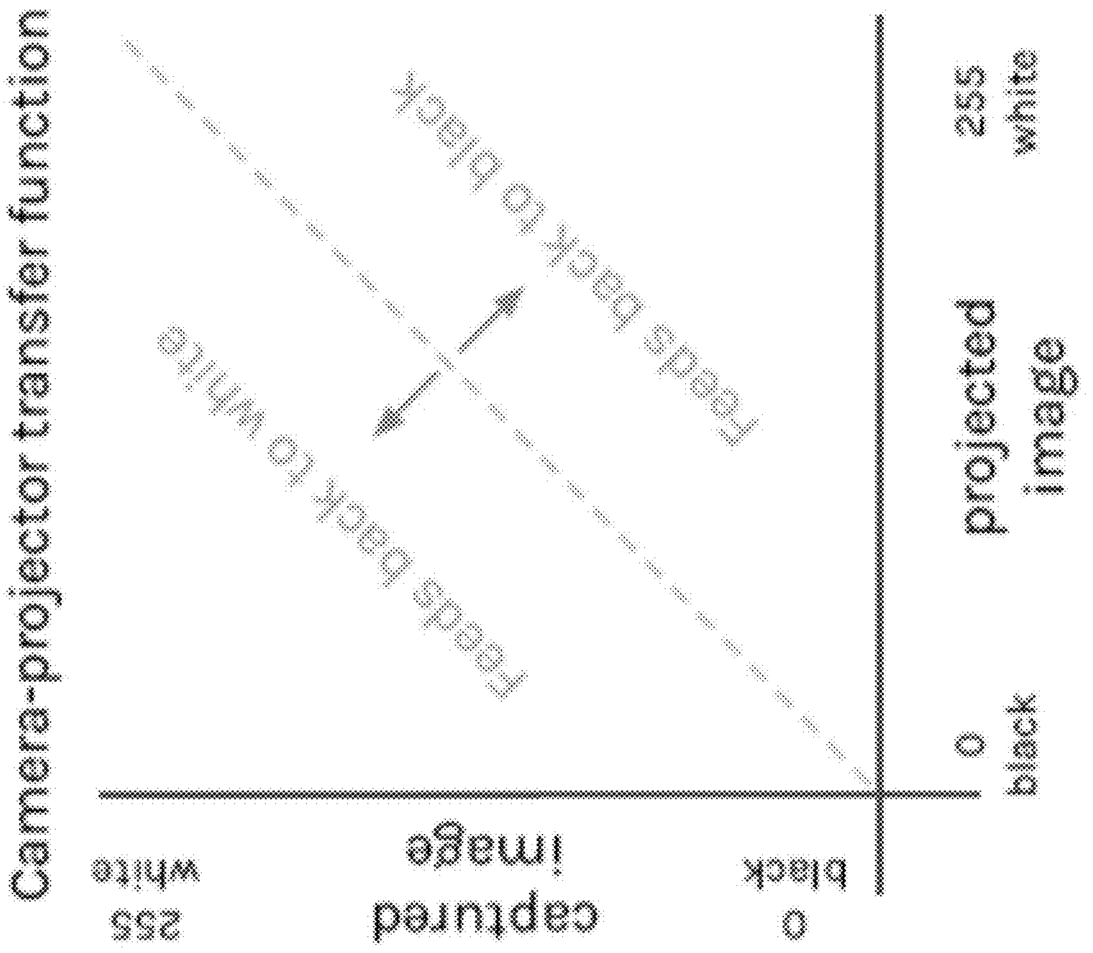
Figure 7D:
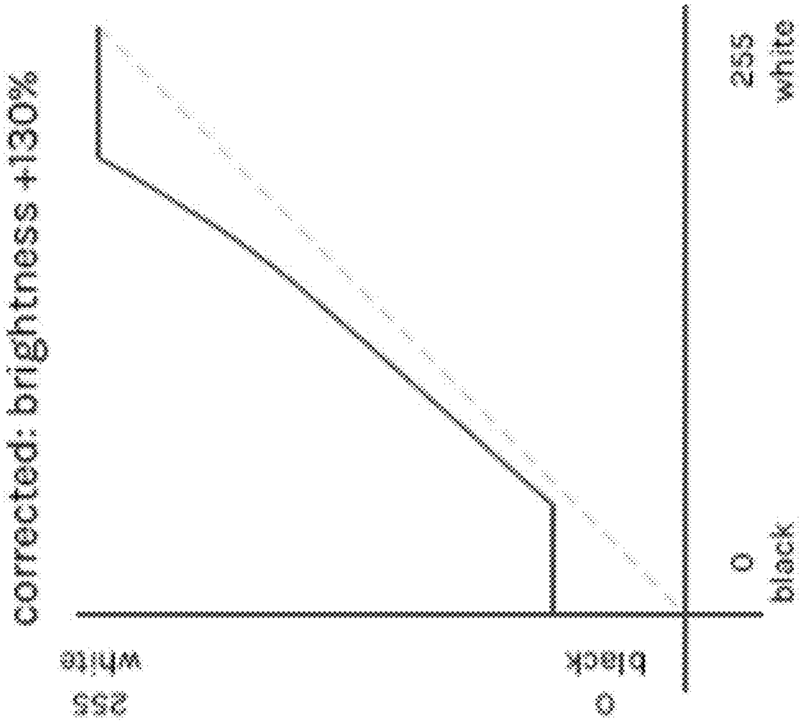
Figure 7C:
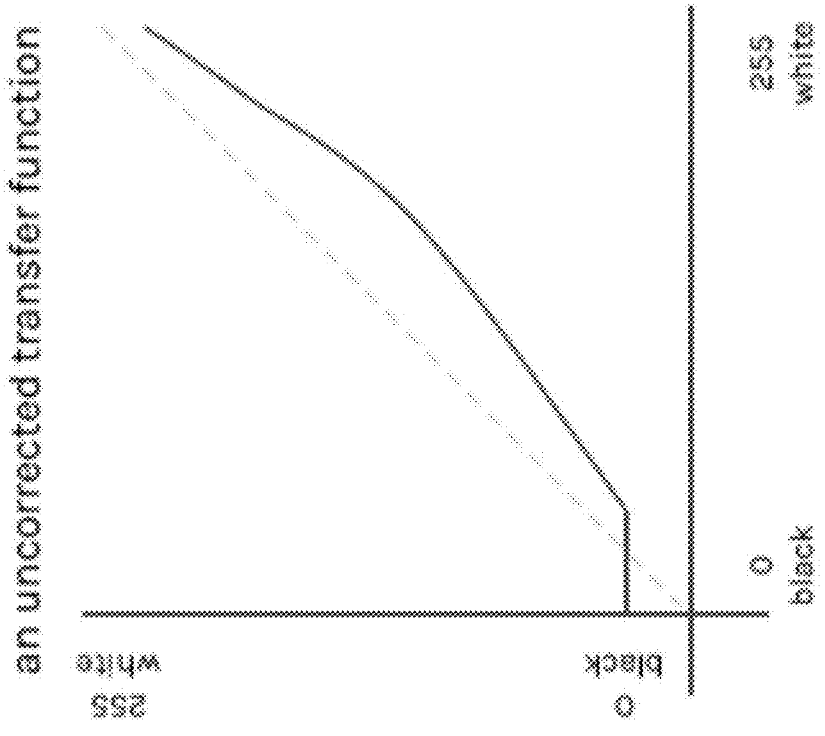

For instance, view 700 of FIG. 7A illustrates an example of an uncorrected video feed, in which different areas of the image projected onto the physical medium feedback into different colors (702*a-c*). One solution involves feedback that moves the brightness of the image in a desired direction. FIG. 7B illustrates a plot 720 for an imaging device (camera)—projector transfer function. Here, as shown, when above the dashed line the system feeds back pixel values towards white (brighter), while when below the dashed line the system feeds back pixel values toward black (darker). FIG. 7C illustrates a plot 740 illustrating an uncorrected transfer function, in which the solid line is generally below the dashed line. In contrast, FIG. 7D illustrates a plot 760 showing a corrected brightness, where the solid line is now above the dashed line. Here, for instance, each iteration of the feedback can be made brighter than the previous iteration. This has the effect that visual echoes will fade to white in approximately 2-3 iterations. In another example, the system could measure the transfer function of different areas of the physical medium and calibrate those areas separately.

Figure 8B:
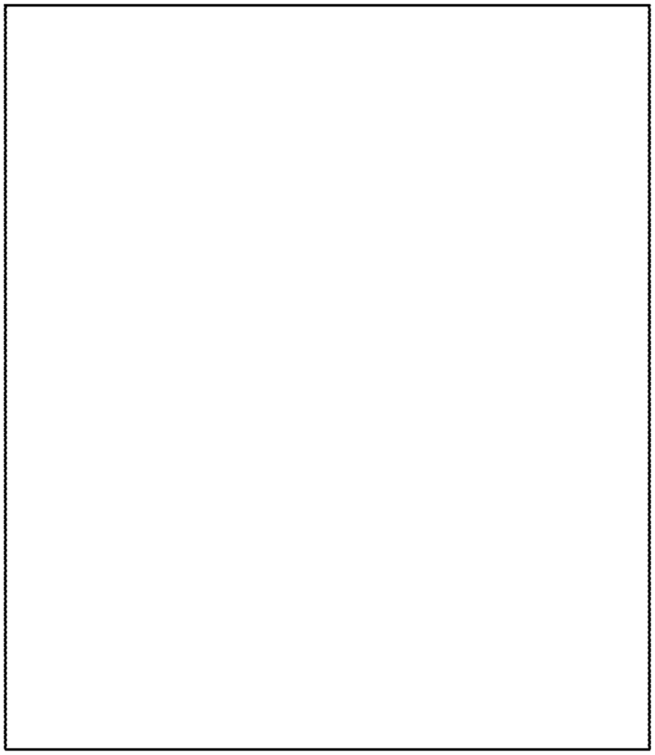
FIGS. 8A-B illustrate an image calibration example in accordance with aspects of the technology.
Figure 8A:
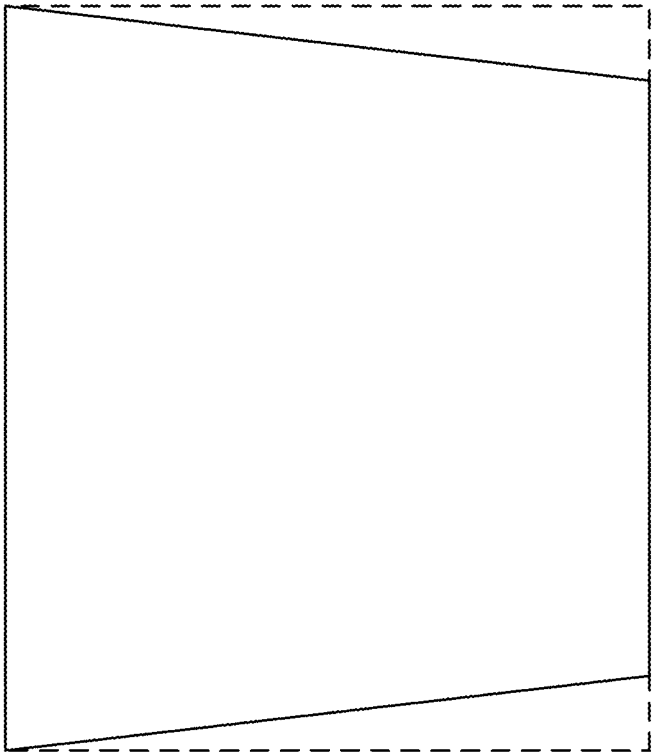

In addition to color correction, the projected image should be calibrated so that digital keystoning (image skew) is avoided. For instance, FIG. 8A illustrates a view 800 in which the dashed outer line indicates the shared canvas view, while the inner trapezoidal line shows that the image is skewed. In contrast, FIG. 8B illustrates another view 820 in which the image has been corrected into a rectangle that encompasses the entire shared canvas. This calibration could be accomplished manually or automatically, so that calibration targets are achieved in order to eliminate image skew.

Copresence Enhancements

As noted above, when using a copresence app to collaborate with remote participants, the system may create bookmarks—snapshots of the shared canvas—at different points in time. The bookmarks may be stored, e.g., in database 284 that is accessible to the participants, or locally in memory of a given participant's computing device. The bookmarks could be viewed by later-joining participants to see the evolution of the collaboration without having to ask the other participants what happened previously. In one example, any participant would be able to manually create a bookmark. For instance, this could be done with a hand gesture or certain body pose, pressing a key (e.g., the spacebar) on the participant's computer, using a separate tool such as a programmable button that is connected to the computer (or physical medium) via a Bluetooth connector, speaking a command, etc.

In another scenario, information from the collaboration may be automatically captured and imported into a task list or calendar program. Here, for example, the system may identify one or more action items for at least one participant, and automatically add such action item(s) to a corresponding app, such as by syncing the action item(s) with the corresponding app.

In a further scenario, a transcript of a copresence session may be generated using a speech-to-text feature. The transcript may be timestamped along with the timing for when information was added to, removed from or modified on the shared canvas. In this way, it could be easy to determine the context for why a particular decision was made.

Depending on the configuration of the copresence app, in yet another scenario the system could allow participants to create the user interface they need, when they need it, e.g., by drawing it on the shared canvas. For example, like a form of programming, this approach would allow users to customize their experience, while reducing computational overhead associated with maintaining elements of a UI that aren't functional—instead they are created when needed. By way of example, they could create a portal to see through to the "other side" of the shared canvas and have a higher fidelity view of the person they are collaborating with. This could be particularly useful for complex discussions where facial expressions would add additional contextual information. Here, written details (e.g., "portal to shell") associated with circling a portion of the shared canvas would indicate what the user interface should do. Alternatively, tactile-based tools could allow for copying and pasting, such as by circling the desired information and using a dragging action across the physical medium to create a copy in another part of the shared canvas.

Figure 9:
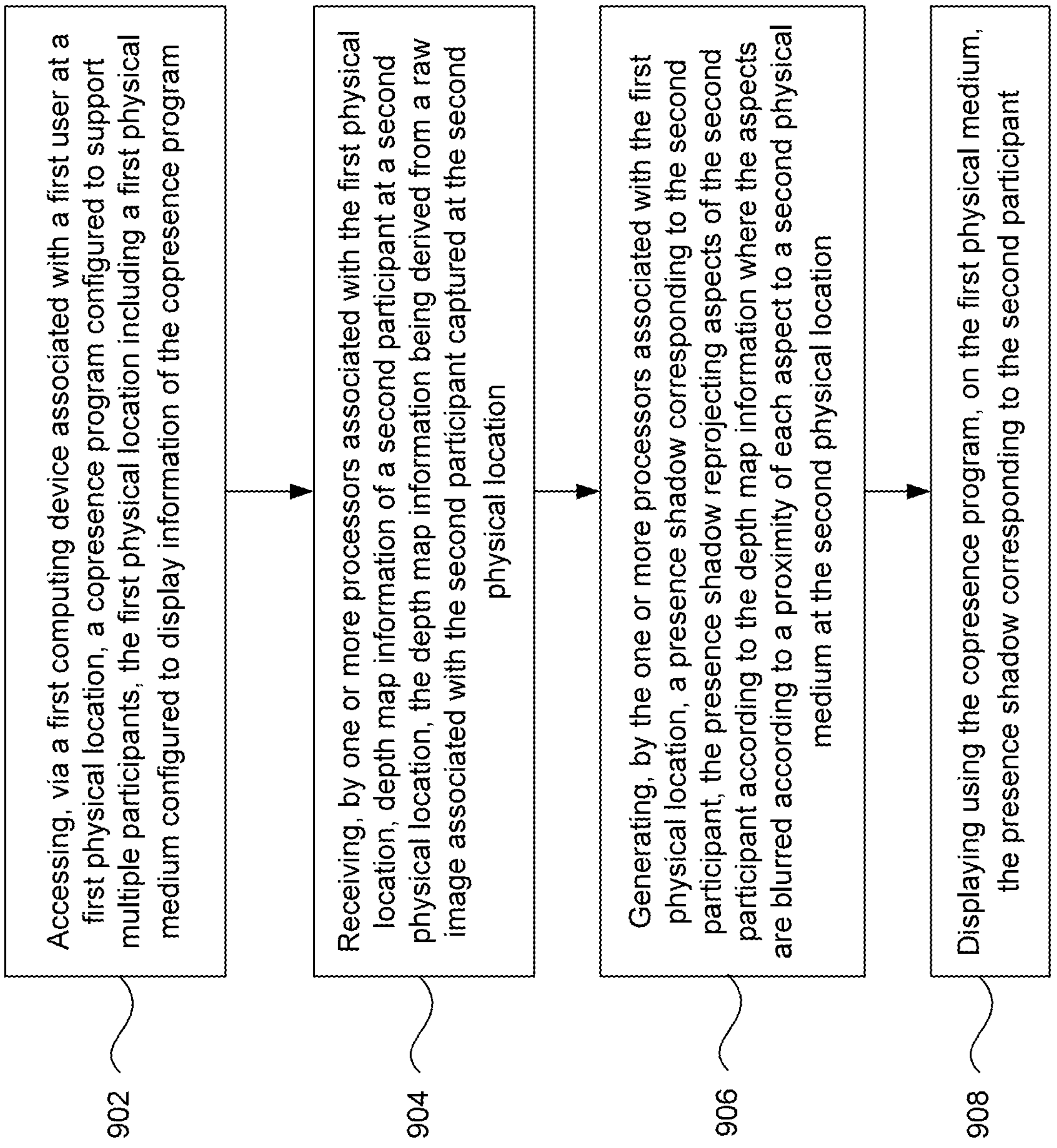
FIG. 9 illustrates a method in accordance with aspects of the technology.

FIG. 9 illustrates a method 900 in accordance with aspects of the technology. At block 902, the method includes accessing, via a first computing device associated with a first user at a first physical location, a copresence program configured to support multiple participants. The first physical location includes a first physical medium configured to display information of the copresence program. At block 904, the method includes receiving, by one or more processors associated with the first physical location, depth map information of a second participant at a second physical location. The depth map information is derived from a raw image associated with the second participant captured at the second physical location. Then at block 906, the method includes generating, by the one or more processors associated with the first physical location, a presence shadow corresponding to the second participant. The presence shadow is used to reproject aspects of the second participant according to the depth map information where the aspects are blurred according to a proximity of each aspect to a second physical medium at the second physical location. And in block 908, the method includes displaying using the copresence program, on the first physical medium, the presence shadow corresponding to the second participant.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

As discussed herein, tactile copresence among two or more remote participants can be employed in various real-time interactive applications. Videoconferencing apps, brainstorming meetings, personal tutorial or training sessions, games and other activities can be implemented with simple physical setups. By only sending body profile information instead of transmitting full-motion video, significant reductions in bandwidth can be achieved. By using skeleton coordinates or other depth-map information received by the other computing devices to form a 3D reprojection of the participant as a presence shadow, full image details of the participant and other items in the background environment are not shown. In addition to reducing bandwidth, this also helps minimize unnecessary details, which can enhance user comfort with being on-screen.

The invention claimed is:

1. A method, comprising:

accessing, via a first computing device associated with a first participant at a first physical location, a copresence program configured to support multiple participants, the first physical location including a first physical medium configured to display information of the copresence program;

receiving, by one or more processors associated with the first physical location, depth map information of a second participant at a second physical location, the depth map information being derived from a raw image associated with the second participant captured at the second physical location;

generating, by the one or more processors associated with the first physical location, a presence shadow corresponding to the second participant, the presence shadow reprojecting aspects of the second participant according to the depth map information where the aspects are blurred according to a proximity of each aspect to a second physical medium at the second physical location;

receiving collaborative information added to the second physical medium; and displaying using the copresence program, on the first physical medium, the received collaborative information and the presence shadow corresponding to the second participant, wherein the received collaborative information is displayed at a first resolution while the presence shadow is displayed at a second resolution lower than the first resolution.

2. The method of claim 1, wherein one or more of the aspects closest to the second physical medium are generated to have a first amount of blurring while one or more of the aspects farthest from the second physical medium are generated to have a second amount of blurring greater than the first amount.

3. The method of claim 1, wherein the presence shadow is configured to illustrate at least one of gesturing or positioning of the second participant.

4. The method of claim 1, wherein generating the presence shadow includes inverting the depth map information prior to blurring.

5. The method of claim 1, wherein the presence shadow is only displayed when the second participant is within a threshold distance of the second physical medium.

6. The method of claim 1, further comprising:

receiving additional collaborative information added to the first physical medium; and integrating the additional collaborative information with the received collaborative information to form a set of integrated collaborative information.

7. The method of claim 6, further comprising generating one or more bookmarks of the set of integrated collaborative information.

8. The method of claim 1, wherein:

the depth map information of the second participant further includes three-dimensional positioning information of a writing implement; and displaying the received collaborative information includes generating a scaled representation of the received collaborative information based on the three-dimensional positioning information of the writing implement.

9. The method of claim 1, wherein the raw image of the second participant is taken from a viewpoint where the second participant is between the second physical medium and a second image capture device at the second physical location.

10. The method of claim 1, further comprising:

capturing, at the first physical location, a raw image of the first participant; and transmitting depth map information derived from the raw image of the first participant to a computing device associated with the second physical location.

11. The method of claim 10, wherein a presence shadow of the first participant is not displayed on the first physical medium at the first physical location.

12. The method of claim 1, further comprising:

receiving audio information of the second participant; and playing the received audio information at the first physical location in conjunction with displaying the presence shadow of the second participant.

13. The method of claim 1, further comprising using the depth map information to separate images of the second participant at the second physical location from collaborative information added to the second physical medium.

14. The method of claim 1, wherein the presence shadow is generated based on a set of skeleton coordinates derived from an image of the second participant.

15. The method of claim 1, further comprising saving an interactive collaboration of the copresence program in memory.

16. The method of claim 15, wherein saving the interactive collaboration includes saving one or more snapshots of collaborative information added to either the first physical medium or the second physical medium.

17. The method of claim 1, further comprising:

identifying tactile input onto either the first physical medium or the second physical medium;

associating the identified tactile input with an action; and either (i) changing how selected information is displayed on the first physical medium based on the action, or (ii) performing a computing operation in response to the action.

18. The method of claim 17, wherein changing how the selected information is displayed includes at least one of moving, scaling, translating or rotating a piece of collaborative information.

19. The method of claim 17, wherein the computing operation is at least one of copying, pasting, saving or transmitting.

20. A system associated with a first participant at a first physical location, the system comprising:

a projector configured to display information on a first physical medium located at the first physical location; and a first computing device having one or more processors, the first computing device being operatively coupled to the projector, the one or more processors being configured to:

access a copresence program configured to support multiple participants;

receive depth map information of a second participant at a second physical location, the depth map information being derived from a raw image associated with the second participant captured at the second physical location;

generate a presence shadow corresponding to the second participant, the presence shadow reprojecting aspects of the second participant according to the depth map information where the aspects are blurred according to a proximity of each aspect to a second physical medium at the second physical location;

receive collaborative information added to the second physical medium; and cause the projector to display on the first physical medium, using the copresence program, the received collaborative information and the presence shadow corresponding to the second participant, wherein the received collaborative information is displayed at a first resolution while the presence shadow is displayed at a second resolution lower than the first resolution.

21. The system of claim 20, further comprising an image capture device configured to capture imagery associated with the first participant at the first physical location, the image capture device having a field of view encompassing the first physical medium.

22. The system of claim 21, wherein:

the image capture device is configured to capture a raw image of the first participant;

the one or more processors are configured to generate depth map information of the first participant based on the captured raw image; and the one or more processors are configured to transmit the depth map information to a computing device associated with the second physical location.

23. A method, comprising:

receiving, via a first computing device accessing a copresence program associated with a first participant at a first physical location, depth map information of a second participant at a second physical location, the depth map information being derived from a raw image associated with the second participant captured at the second physical location;

generating, by one or more processors associated with the first physical location, a presence shadow corresponding to the second participant, the presence shadow reprojecting aspects of the second participant in a depth-based gradient according to the depth map information; and displaying using a copresence program, on a first physical medium at the first physical location, the presence shadow corresponding to the second participant.

24. The method of claim 23, wherein the depth-based gradient is based on a proximity of each aspect to a second physical medium at the second physical location.

25. The method of claim 24, wherein one or more of the aspects closest to the second physical medium are a darkest of the depth-based gradient while one or more of the aspects farthest from the second physical medium are a lightest of the depth-based gradient.

* * * * *